(12) United States Patent
Brown

(10) Patent No.: US 11,327,338 B1
(45) Date of Patent: May 10, 2022

(54) DEVICE FOR COUPLING A TEMPLE TO AN EYEGLASS FRAME

(71) Applicant: Peter Brown, Great River, NY (US)

(72) Inventor: Peter Brown, Great River, NY (US)

( * ) Notice: Subject to any disclaimer, the term of this patent is extended or adjusted under 35 U.S.C. 154(b) by 188 days.

(21) Appl. No.: 16/741,046

(22) Filed: Jan. 13, 2020

(51) Int. Cl.
*G02C 5/22* (2006.01)

(52) U.S. Cl.
CPC ......... *G02C 5/2218* (2013.01); *G02C 5/2254* (2013.01); *G02C 5/2272* (2013.01)

(58) Field of Classification Search
CPC ...... G02C 5/20; G02C 5/2218; G02C 5/2254; G02C 5/2272
See application file for complete search history.

(56) References Cited

U.S. PATENT DOCUMENTS

| | | | | |
|---|---|---|---|---|
| 2,504,749 | A * | 4/1950 | Stepacoff | G02C 5/22 16/228 |
| 4,017,165 | A | 4/1977 | Davis | |
| 4,544,245 | A | 10/1985 | Stansbury, Jr. | |
| 5,056,907 | A | 10/1991 | Weber | |
| 5,398,377 | A | 3/1995 | Takiyama | |
| 6,430,778 | B1 | 8/2002 | King | |
| 2008/0013040 | A1 | 1/2008 | Anderl | |
| 2013/0314661 | A1* | 11/2013 | Masse | G02C 5/2272 351/153 |
| 2014/0247421 | A1* | 9/2014 | Chang | G02C 5/146 351/116 |
| 2017/0123228 | A1 | 5/2017 | Favaro | |

FOREIGN PATENT DOCUMENTS

| | | | |
|---|---|---|---|
| EP | 0851264 A1 * | 7/1998 | ............ G02C 5/008 |
| KR | 200468381 A1 | 5/2013 | |
| WO | 2012002681 A2 | 1/2012 | |
| WO | 2017216328 A1 | 12/2017 | |

OTHER PUBLICATIONS

Machine translation of EP-0851264-A1 retrieved from Espacenet Aug. 31, 2021 (Year: 2021).*

* cited by examiner

*Primary Examiner* — Cara E Rakowski
(74) *Attorney, Agent, or Firm* — Betsy Kingsbury Dowd; BKDowd Law, P.C.

(57) ABSTRACT

Eyewear device includes an eyeglass frame, a temple, and a coupling device for hingedly coupling the temple to the eyeglass frame, formed of an elastically deformable material, and including a single flexible arm of an elongate shape and a front end portion positioned and retained against the front surface of the eyeglass frame. The single flexible arm extends from the front end portion into a slot in the frame and an internal elongate slot in the temple positioned in opposing alignment therewith. The elasticity of the coupling device flexibly, hingedly couples the temple to the eyeglass frame and allows a temple that has suffered inordinate bending moments and directions to instantly return to nominal use by retightening or replacing the coupling device, and/or by repositioning the temple to properly abut the eyeglass frame.

19 Claims, 18 Drawing Sheets

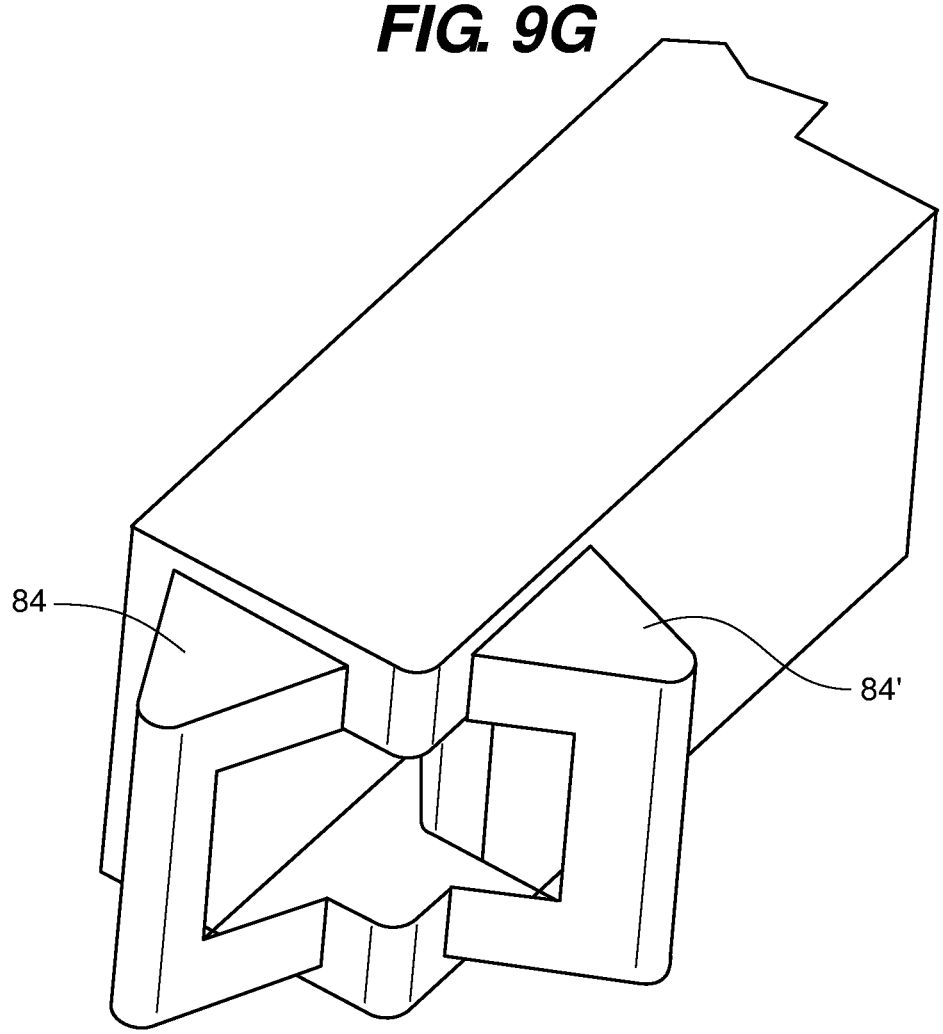

DEVICE FOR COUPLING A TEMPLE TO AN EYEGLASS FRAME

FIELD OF THE DISCLOSURE

The present invention relates to hinge devices for coupling a temple to an eyeglass frame and, particularly, to a flexible hinge device for coupling a temple to an eyeglass frame and to eyeglasses with flexibly hinged temples.

BACKGROUND

Most conventional eyeglasses include a pair of temples that extend from the outer sides of the eyeglass frame to sit on one's ears in use, thereby holding the lenses in proper position in-use in front of the wearer's eyes. One end of each temple is hingedly connected to an outer side or end of the eyeglass frame so that the temples can be folded for storing the glasses when not in use. This connecting hinge is typically configured to rotate around a metal or non-metal pin or screw between an open position, with the temples angled approximately perpendicular to the plane of the eyeglass frame and lenses for use, and a folded position, with the temples folded inward and overlapping one another, and angled approximately parallel to the eyeglass frame for storage.

The pin-type rotatable hinges provide a fairly simple solution for folding glasses into a more compact form for storage. These hinges have two arms, one arm fixed to the temple, and the other arm fixed to the frame, which include barrels positioned to interleave with each other to form a cylindrical opening through which the pin, which may be a screw, is inserted for attaching the temple to the frame via the arms, and for hingedly rotating the temple between a perpendicular, in-use position to the frame, and a stored position parallel to the frame. Too often, these conventional hinged eyeglasses are fatally damaged when either the hinge coupling the temple to the frame, or the temple itself, breaks or is bent beyond repair, rendering the eyeglasses useless. In the event that portions of the hinge are lost or broken, the user will typically need the assistance of an optician to obtain and/or replace the lost or broken parts, which may not be stock items.

In addition, currently, there is no known eyeglass design that allows one to easily change the coloring and/or style of the temples for a different aesthetic and/or function.

Accordingly, there is a need for a device for hingedly coupling temples to an eyeglass frame that is more durable than the conventional hinge used in eyewear, and which allows immediate repair to full serviceability. There is also a need for eyewear that incorporates the device.

In addition, there is a need for a device for hingedly coupling a temple to an eyeglass frame that allows easy interchangeability of the temples either to extend the functional lifetime of the eyeglasses, or simply to allow one to change the functionality, coloring and/or style of the temples.

SUMMARY

Features of the disclosure will become apparent from the following detailed description considered in conjunction with the accompanying drawings. It is to be understood, however, that the drawings are designed as an illustration only and not as a definition of the limits of this disclosure.

The present disclosure is directed to a coupling device for hingedly coupling temples to an eyeglass frame that is more durable than the conventional hinge used in eyewear, and which allows immediate repair to full serviceability, preferably within minutes or even seconds.

The present disclosure is further directed to eyewear that includes the coupling device for hingedly coupling temples to the eyeglass frame.

The present disclosure is also directed to a coupling device for hingedly coupling temples to an eyeglass frame that allows easy interchangeability of the temples either to extend the functional usage or lifetime of the eyeglasses, or simply to allow one to change the coloring and/or style of the temples for a different aesthetic.

The coupling device is configured to hingedly couple a temple to an eyeglass frame of eyewear without the need for a pinned hinge as conventionally used.

The present disclosure is also directed to an eyewear device, including an eyeglass frame, a temple, and a coupling device for hingedly coupling the temple to the eyeglass frame. The eyeglass frame includes a side portion having a front surface, a rear surface defining a hinging interface between the eyeglass frame and the temple, and a slot extending from the front surface to the rear surface therethrough. The temple includes an abutting end portion proximal to the side portion, and an internal elongate slot extending through the abutting end portion of the temple. The coupling device includes a body, formed of an elastically deformable material, coupling the eyeglass frame to the temple. The body includes a single flexible arm of an elongate shape and a front end portion extending perpendicularly outward to the single flexible arm. The front end portion of the body of the coupling device is positioned and retained against the front surface of the side portion, the single flexible arm extending therefrom into the slot, with the internal elongate slot positioned in opposing alignment therewith. The coupling device is configured to flexibly, hingedly couple the temple to the eyeglass frame for positioning the temple between an open in-use position and a closed position for storing.

The elasticity of the coupling device, in aspects, allows a temple that has suffered inordinate bending moments and directions to instantly return to nominal use by retightening the coupling device.

The present disclosure is also directed to eyewear device including an eyeglass frame, a temple, and a coupling device for hingedly coupling the temple to the eyeglass frame. The eyeglass frame includes a side portion having a front surface, a rear surface defining a hinging interface between the eyeglass frame and the temple, and a slot extending from the front surface to the rear surface therethrough. The temple includes an abutting end portion proximal to the side portion, and an internal elongate slot extending through the abutting end portion of the temple. The coupling device includes a body coupling the eyeglass frame to the temple. The body is formed of an elastically deformable material, and includes a single flexible arm of an elongate shape and a front end portion extending perpendicularly outward to the single flexible arm. The front end portion of the body of the coupling device is positioned and retained against the front surface of the side portion, the single flexible arm extending therefrom into the slot and the internal elongate slot positioned in opposing alignment therewith. The coupling device is configured to flexibly, hingedly couple the temple to the eyeglass frame for positioning the temple between an open in-use position and a closed position for storage.

In aspects, the single flexible arm further includes an attaching element positioned on an end portion distal to the front end portion.

The temple may further include a complementary attaching element configured to detachably secure the single flexible arm to the temple via the attaching element.

In additional aspects, the complementary attaching element may be a peg and the attaching element a hole sized and positioned to capture and retain the peg therein.

In aspects, the eyewear device may further include a pair of cooperating stabilizing elements, a first stabilizing element of the pair being positioned on an end surface of the abutting end portion of the temple and a second stabilizing element of the pair being positioned on the hinging interface of the eyeglass frame to cooperate and engage therewith for stably repositioning the temple between the open in-use position and the closed position for storing.

One of the pair of cooperating stabilizing elements may include a protruding cylindrical surface and a complementary one of the pair includes a complementary cylindrically shaped indentation.

The side portion of the eyeglass frame, in aspects, may include a recess in the front surface, wherein the front end portion of the body of the coupling device is positioned against the front surface and retained within the recess.

In aspects, the single flexible arm includes at least one frictional element formed along a lengthwise surface of the single flexible arm, and the internal elongate slot of the temple includes at least one complementary frictional element positioned along an opposing surface to the lengthwise surface, the at least one frictional element and the at least one complementary frictional element being shaped and positioned to frictionally engage and detachably retain the temple to the eyeglass frame via the coupling device.

The at least one frictional element may, in aspects, include a plurality of teeth and the at least one complementary frictional element may include a plurality of complementary teeth configured to mesh with the plurality of teeth to detachably retain the temple to the eyeglass frame.

In aspects, the body of the coupling device is formed of an elastomer material.

The elastomer material may be one of a rubber and a thermoplastic elastomer material.

In further aspects, the body of the coupling device including the at least one frictional element of the single flexible arm is formed of an elastomer material and the at least one complementary frictional element are formed of one of a metal, a metal alloy, and a plastic.

In aspects, the body of the coupling device is sufficiently elastic to allow over-rotation of the temple in any direction beyond a nominal operating angular range of motion relative to the eyeglass frame without breakage of the temple or the coupling device.

The pair of cooperating stabilizing elements in aspects of the eyewear device may include a first pair and a second pair. The first stabilizing element of each of the first pair and the second pair may be positioned along opposing sides of the internal elongate slot in the temple, and the second stabilizing element of each of the first pair and the second stabilizing element of the second pair may be positioned along opposing sides of the slot in the eyeglass frame.

The first stabilizing element of each pair of cooperating stabilizing elements may further include, in aspects, an inner-facing portion positioned along an inner-facing surface of the abutting end portion of the temple. The first stabilizing element may further include a pair of locking tabs, and the second stabilizing element may further include a notch shaped to receive each of the locking tabs. A first tab of the pair of locking tabs, in particular aspects, protrudes from the end surface of the temple and is seated in the notch in the open in-use position, and a second tab of the pair of locking tabs, in particular aspects, protrudes from the inner-facing surface of the temple and is seated in the notch in the stored position.

The body of the coupling device is preferably sufficiently elastic, in aspects, to allow the temple to remain operatively connected to the eyeglass frame in transitioning from the in-use position to the stored position, the temple being configured to sustain sufficient rotational force to disengage the first tab from the notch and for flexibly hinging the temple to engage the second tab in the notch in the stored position.

In particular aspects, the first stabilizing element includes a protruding curved portion of a cylindrical slice protruding from the abutting end surface and the inner-facing surface of the temple, wherein an axis of the cylindrical slice is positioned along a vertical axis of the eyeglass frame, and wherein the first tab and the second tab protrude from two angularly separated positions along the protruding curved portion for engaging the notch in the open in-use position and the stored position, respectively, and wherein the hinging interface of the eyeglass frame includes an indented concave portion including the notch further indented therein, the indented concave portion shaped for seating the protruding curved portion therein.

In aspects, the first stabilizing element of the first pair is positioned proximate an upper edge of the abutting end portion of the temple, and the first stabilizing element of the second pair is positioned proximate a lower edge of the abutting end portion, the internal elongate slot being positioned between the first stabilizing element of the first pair and the second pair. The second stabilizing element of each of the first pair and the second pair is positioned and shaped to engage each of the first stabilizing elements, the slot being positioned between the second stabilizing element of the first pair and the second pair and in alignment with the internal elongate slot in the open in-use position.

In additional aspects, each of the first tab and the second tab may be rectangularly shaped protrusions positioned along the abutting end surface and the inner-facing surface, respectively, of the temple, and the notch is an indentation in the hinging interface of the eyeglass frame shaped to snugly receive each of the first tab and the second tab.

In further aspects, the temple may also include a pocket intersecting the internal elongate slot and extending along an inner-facing side of the abutting end portion.

In addition to the above aspects of the present disclosure, additional aspects, objects, features and advantages will be apparent from the embodiments presented in the following description and in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the following detailed description in conjunction with the accompanying drawings.

FIG. 9G is a perspective view of an embodiment of an abutting end portion of a temple with an embodiment of stabilizing elements formed as locking tabs.

Figure 1A:
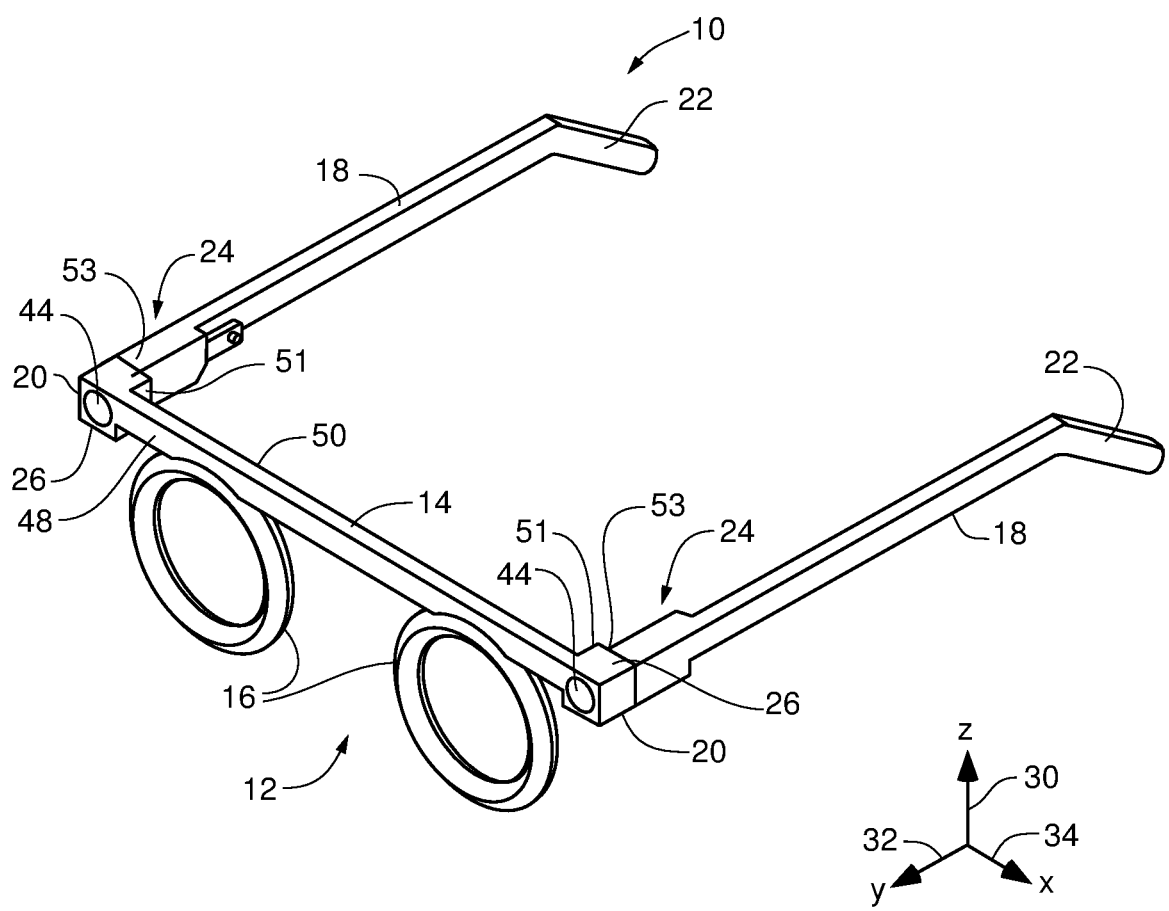
FIG. 1A is a pictorial representation of an embodiment of eyewear of the present disclosure in an open in-use position.

The various aspects of the present disclosure mentioned above are described in further detail with reference to the aforementioned figures and the following detailed description of exemplary embodiments.

DETAILED DESCRIPTION

The following sections describe exemplary embodiments of the present disclosure. It should be apparent to those skilled in the art that the described embodiments of the present disclosure provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present disclosure as defined herein and equivalents thereto.

Particular illustrative embodiments of the present disclosure are described hereinbelow with reference to the accompanying drawings; however, the disclosed embodiments are merely examples of the disclosure, which may be embodied in various forms. It should be apparent to those skilled in the art that the described embodiments provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present disclosure as defined herein and equivalents thereto. Well-known functions or constructions and repetitive matter are not described in detail to avoid obscuring the present disclosure in unnecessary or redundant detail. Therefore, specific structural and functional details disclosed herein are not to be interpreted as limiting. In this description, as well as in the drawings, like-referenced numbers represent elements which may perform the same, similar, or equivalent functions.

Throughout the description, where items are described as having, including, or comprising one or more specific components or features, or where methods are described as having, including, or comprising one or more specific steps, it is contemplated that, additionally, there are items of the present disclosure that consist essentially of, or consist of, the one or more recited components or features, and that there are methods according to the present disclosure that consist essentially of, or consist of, the one or more recited processing steps.

The present disclosure is directed to a coupling device for hingedly coupling temples to an eyewear frame that allows easy interchangeability of the temples either to extend the functional usage or lifetime of the eyewear, or simply to allow one to change the coloring and/or style of the temples for a different aesthetic. The coupling device further prevents breakage of the temple and eyeglass frame that commonly occurs in conventional eyewear from over-rotation of the temple outwardly from its in-use open position. As further described herein, the present disclosure is also directed to eyewear including the coupling device.

Referring to FIG. 1A, an embodiment of an eyewear device 10 of the present disclosure includes an eyeglass frame 12, which may include a nose bridge 14 connecting a pair of lens holders 16 configured to hold lenses. The eyewear device 10 also includes a pair of temples 18, each temple 18 extending from the plane of the eyeglass frame 12 when positioned for use on a user. Each temple 18 also preferably includes an abutting end portion 24 proximal to a side portion 26 of the eyeglass frame 12 along a corresponding side 20 of the eyeglass frame 12 and eyewear device 10. When the temple 18 is in use in the open position shown in FIG. 1A, the abutting end portion 24 contacts the eyeglass frame 12 at a substantially perpendicular angle, the angle preferably being adjustable to suit each user and normally allowing for within +/− about 3 degrees, or in embodiments, +/− about 5 degrees from perpendicular, for the comfort of a specific eyeglass wearer. The temples 18 may also include ends or tips 22, which may be curved to comfortably fit over one's ears.

Figure 1B:
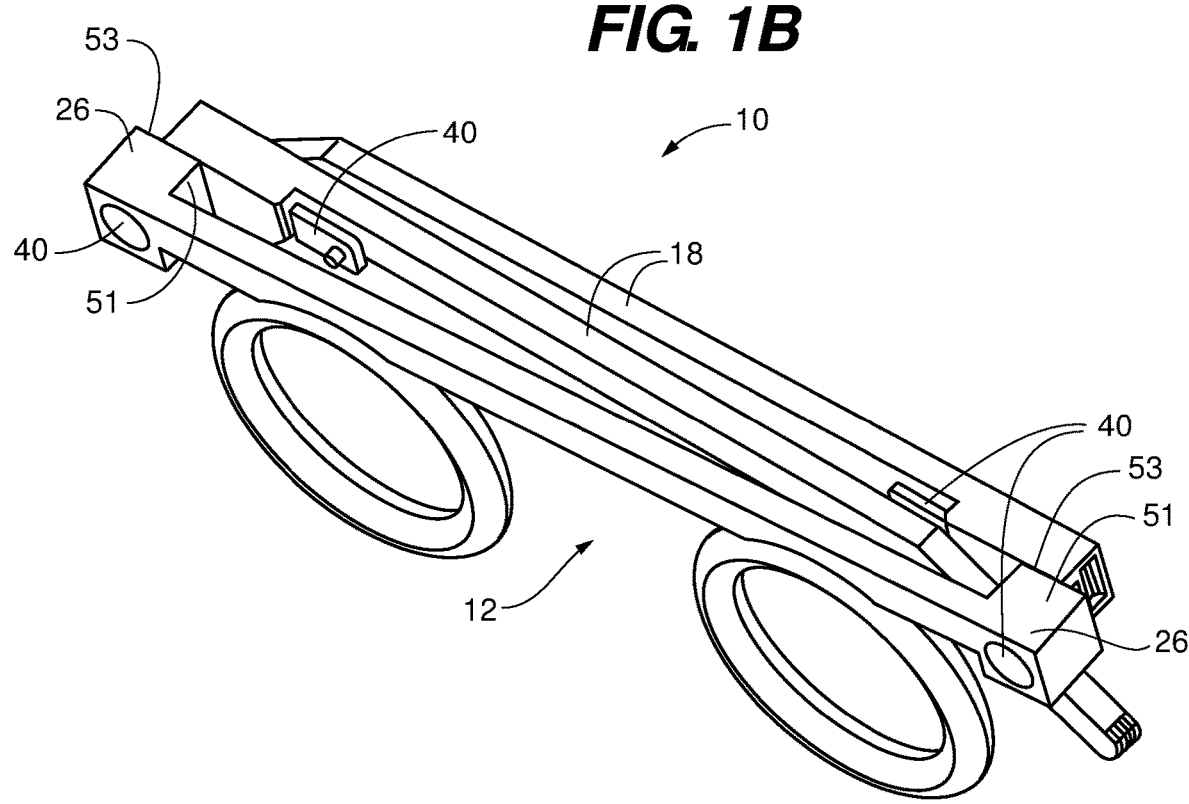
FIG. 1B is a pictorial representation of the eyewear device of FIG. 1A in a closed position for storage.

As with conventional eyeglasses, each temple 18 of the eyewear device 10 is preferably rotatable inward toward each other about an axis of rotation, defined as a vertical axis 30 of the eyewear device 10, from an open in-use position as shown in FIG. 1A to a closed position for storage, with the temples folded inward toward, and substantially parallel to, the frame 12, as shown in FIG. 1B. For reference, the orientation of the axis of rotation 30 is also referred to herein as the vertical or "z-axis" and is shown in FIG. 1A in relation to a longitudinal axis (also referred to as the "y-axis") 32 defined for the eyewear device 10, which is aligned parallel to a length of the temple 18 when oriented in the open position for use, and to a transverse axis (also referred to as the "x-axis") 34 extending width-wise of the eyeglass frame 12 between the temples 18.

Figure 2:
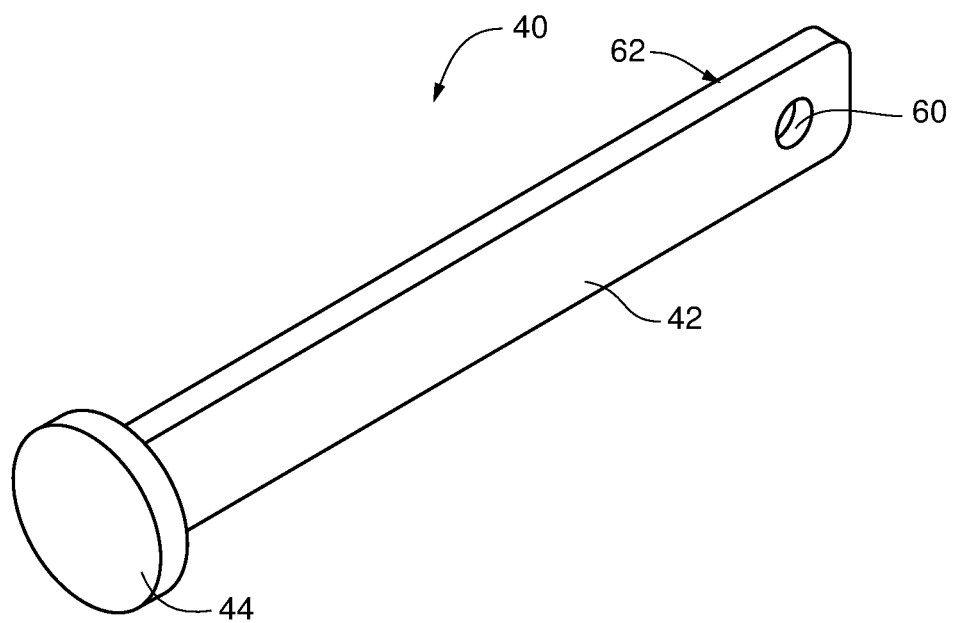
FIG. 2 is a pictorial representation of an embodiment of a coupling device of the present disclosure.

Referring to FIGS. 1A and 1B, as well as to FIG. 2, the eyewear device 10 of the present disclosure includes a coupling device 40 for hingedly coupling one of the temples 18 to the eyeglass frame 12 as shown in the exemplary figures. The coupling device 40, in embodiments, is formed as one body from a single mold, for example, of an elastically deformable material, e.g., an elastic or elastomer material, and allows flexible hinging of the temple 18 around the axis of rotation 30 from an open in-use position (FIG. 1A) to a closed position (FIG. 1B) for storage, without the use of the conventional pin or screw used in the rigid, two-armed so-called barrel hinges found in most conventional eyewear.

In further reference to FIG. 2, the coupling device 40 includes a single flexible arm 42, preferably of an elongate shape, and a front end portion 44, which may extend perpendicularly to the single flexible arm 42 and is dimensionally larger in cross-section than that of the single flexible arm 42. In the embodiment shown, the single flexible arm 42 is a flat, thin, elongate slat of an elastomer, preferably a stiff elastomer, with a rectangular profile, and the front end portion 44 is a cylindrical slice, resembling the head of a nail, extending perpendicularly outward from and beyond the cross-sectional dimensions of the single flexible arm 42.

As used herein, a longitudinally-aligned surface, also referred to as a lengthwise surface, of the temple 18 or of the coupling device 40, including of the single flexible arm 42, refers to any surface aligned along the longitudinal axis 32 of the temple 18, i.e., parallel or substantially parallel to its length as described above. For further reference, an "inner-facing" surface and "outer-facing" surface refer to the surfaces of the eyewear in use, wherein an "inner-facing" surface faces the user, and an "outer-facing" surface faces away from the user.

Figure 3:
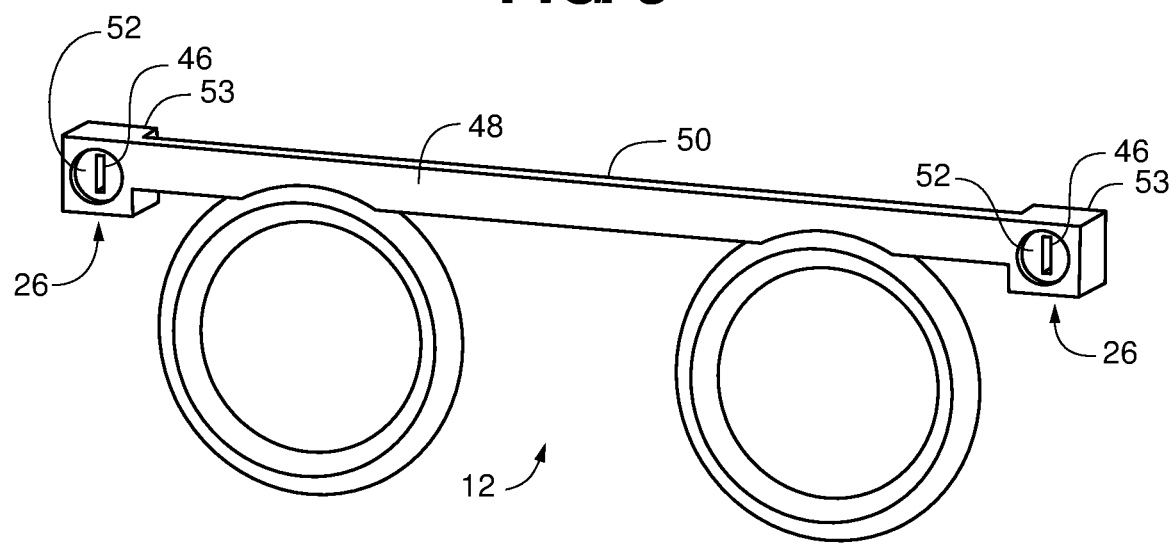
FIG. 3 is a pictorial representation of a front view of the eyeglass frame of FIG. 1A.

The front end portion 44, as can be seen from FIG. 1A, and in further reference to FIGS. 2 and 3, cooperates with the eyeglass frame 12 to allow coupling of the coupling device 40 to the temple 18 via the single flexible arm 42 without any pin, or two-armed hinge, as used in conventional eyewear.

In embodiments, referring to FIG. 3, the eyeglass frame 12 includes a slot 46 in each side portion 26 extending from, and through, a front surface 48 and a portion of a rear surface 50 of each side portion 26 of the eyeglass frame 12 to form a through-hole. The portion of the rear surface 50 of each side portion 26 defines a hinging interface 53 of the eyeglass frame 12 with the temple 18. The side portion 26, in embodiments, also includes a recess 52 in the front surface 48. In embodiments, the front end portion 44 of the coupling device 40 is positioned against the front surface 48 and retained within the recess 52.

Each side portion 26 of the eyeglass frame 12, in embodiments, also has a spacer portion 51, which extends toward the temple 18 and beyond the plane of the eyeglass frame 12. The spacer portion 51 spaces the hinging interface 53 from an adjacent central section of the rear surface 50 and from the plane of the eyeglass frame 12 to enable closure of the temples 18 in a compact form.

In embodiments, each spacer portion 51 may be of a wedged shape, such that each of the hinging interface 53 is angled inward toward the center of the eyewear 10 for compactly folding the temples 18 inwardly and atop each other in the stored position. In further embodiments, each spacer portion 51 may be at a different angle, in embodiments, within a difference of two degrees, the temple 18 interfacing with the less steeply angled wedge being configured to close on top of the temple 18 interfacing the more steeply angled wedge. The angle of the hinging interface 53 allows the temples to swing past an angle that would correspond to parallel to the eyeglass frame 12 by as much as about 3.5 degrees in the closed position, as shown in FIG. 1B.

As will be further understood from the embodiments described herein, additional aspects of the hinging interface 53 and the abutting end portion 24 of the temple 18 to which it is hingedly connected may include cooperating stabilizing features that allow a smooth transition between an open, in-use, position and a closed position for storage, and that also help avoid fatal failure of the temple 18 should it be over-rotated or rotated "off-track". The cooperating stabilizing elements may also include, or be formed with, detent stops configured to lock the temple 18 in the open position, the detent stops being suitably positioned and shaped to position and hold, or lock, the temple when seated in the open position to promote a snug, secure, fit against the hinging interface 53 of the eyeglass frame 12. The temple 18 is disengaged from the open position when subjected to sufficient rotational force by a user, allowing the temple 18 to then be rotated to the closed position. Optionally, the cooperating stabilizing elements are provided with additional detent stops positioned to lock the temple in the closed position.

It will be appreciated that in some embodiments encompassing such cooperating stabilizing elements, the spacer portion 51 is not necessary to allow sufficient folding of the temples 18 in the closed position, so that the hinging interface 53 may be substantially planar with the adjacent central portion of the rear surface 50.

Referring again to FIG. 3, the slot 46 preferably has a cross-section that is dimensioned and shaped to allow insertion of the single flexible arm 42 therethrough, preferably with minimal transverse or vertical movement within the slot 46.

Figure 4A:
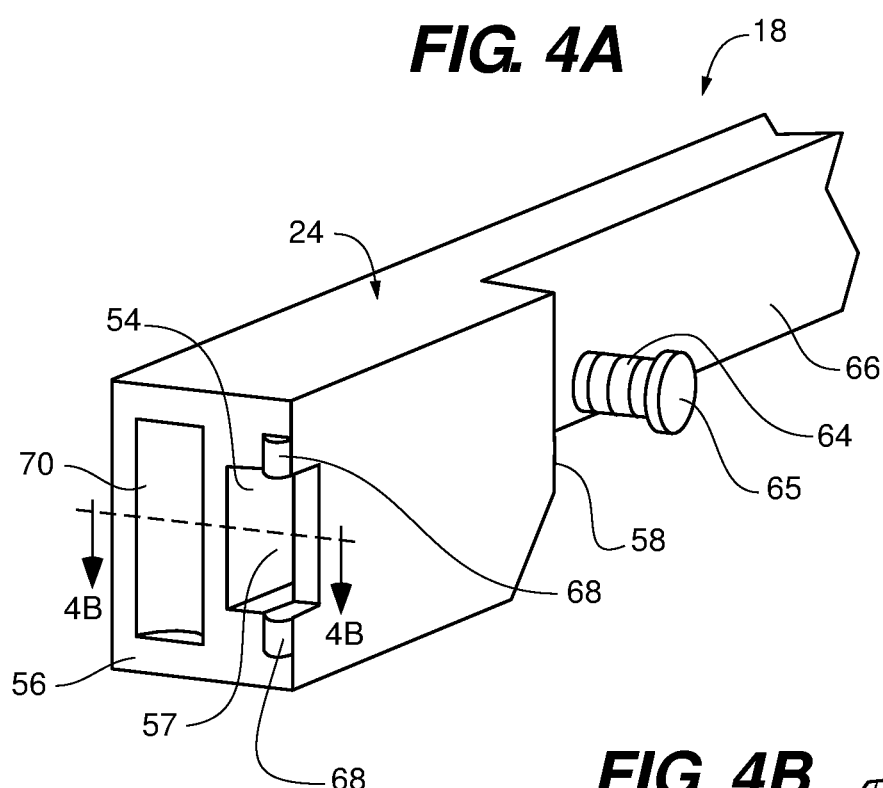
FIG. 4A is a pictorial representation of an abutting end portion of an embodiment of a temple for the right side (i.e., for resting on a user's right ear) of eyewear of the present disclosure.
Figure 4B:
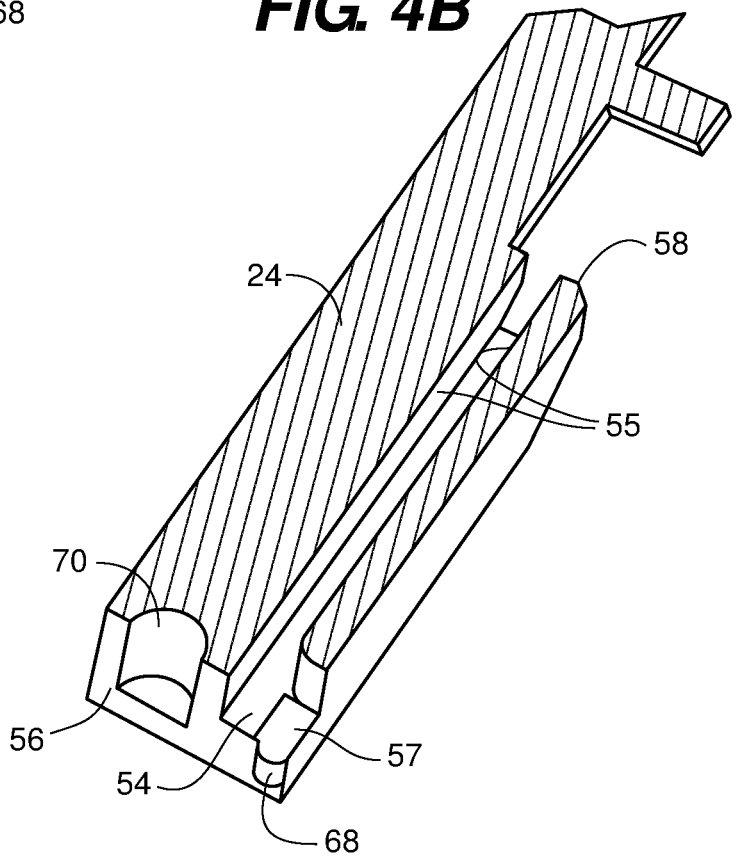
FIG. 4B is a view of the abutting end portion of FIG. 4A sliced along a horizontal plane.

Referring also to FIGS. 4A and 4B, the abutting end portion 24 of the temple 18 also includes an internal elongate slot 54 extending through the temple 18. The internal elongate slot 54 has an opening on an abutting end surface 56 of the abutting end portion 24 and, in embodiments, extends through the abutting end portion 24, including through a distal end surface 58. The internal elongate slot 54 has a cross-section that is dimensioned and shaped to allow insertion of the flexible arm 42 therethrough. It will be appreciated that appropriate relative dimensioning of the slot 46 and of the internal elongate slot 54 to the single flexible arm 42 of the coupling device 40, as shown in FIG. 2, for example, also enhances stability of the temple 18 positioned in the open position.

In embodiments, at least two opposing sides of the single flexible arm 42 contact opposing inner walls 55 of the internal elongate slot 54 upon insertion.

In embodiments, the single flexible arm 42 and internal elongate slot 54 are dimensioned to form a frictional fit.

To flexibly, hingedly, couple the temple 18 to the eyeglass frame 12, in embodiments, the internal elongate slot 54 of the temple 18 is positioned in opposing alignment with the slot 46 in the eyeglass frame 12, and the single flexible arm 42 is inserted into the slot 46 from the front side (FIG. 3) of the eyeglass frame 12 into and through both the slot 46 and the internal elongate slot 54 of the temple 18, until the front end portion 44 is positioned against the front surface 48. In embodiments, the front end portion 44 of the coupling device 40 is positioned within the recess 52 and against the recessed portion of the front surface 48 of the eyeglass frame 12.

Referring again to FIG. 2, the coupling device 40, in embodiments, may also include an attaching element 60 positioned, in embodiments, on an end portion 62 that is distal to the front end portion 44. Embodiments of the attaching element 60 may include an indentation or, as shown in FIG. 2, a through-hole, which may be used to assist in assembly of the coupling device 40 to the eyewear 10. In other embodiments, the attaching element 60 may be a tab, peg, or other protrusion, or any other suitable attaching element which may be used to assist in assembly of the coupling device 40 to the eyewear 10. For example, a tool may be used to grab the attaching element 60 and pull the single flexible arm 42 through the internal elongate slot 54 until the head (front end portion) 44 of the coupling device 40 is held firmly against the front surface 48, and in embodiments, within the recess 52 in the front surface 48.

Referring also to FIG. 4A, in embodiments, the eyewear device 10 may also include a complementary attaching element 64 that is fixed to, or formed from, an inner-facing surface 66 of the temple 18, which is configured to detachably secure the single flexible arm 42 in position to the temple 18 via the attaching element 60.

In other embodiments of the eyewear device 10 and coupling device 40, no complementary attaching element 64 is needed. For example, in embodiments, the cross-sectional dimensions of the single flexible arm 42 of the coupling device 40 (in its unstretched, relaxed form) and of the elongated internal slot 54 may be substantially equal, with small enough tolerance to provide an interference fit that resists movement of the coupling device 40 once installed. As described further below, the attaching element 60 allows the coupling device 40 to be pulled and thus stretched during installation. When stretched, the cross-sectional dimension of the coupling device 40 shrinks, facilitating its installation. Upon release of the attaching element 60, the cross-sectional dimensions of the single flexible arm 42 expands to its nominal, relaxed size, to provide an interference fit with the elongated internal slot 54. Removal of the coupling device 40 is similarly achieved by pulling on the end of the single flexible arm 42, using the attaching element 60, in embodiments, which again shrinks the cross-sectional dimensions of the single flexible arm 42 allowing it to be urged or quickly pulled out of the elongated internal slot 54.

Additional embodiments of the eyewear device 10 and coupling device 40 in which no complementary attaching element 64 is needed are further described in reference to FIGS. 11A through 14.

Referring again to the embodiments shown in FIG. 1A and FIG. 4A, for example, which include the complementary attaching element 64, the complementary attaching element 64 may be a peg sized to fit through the hole provided as the attaching element 60 in FIG. 2. Once a user has engaged the attaching element 60, using a tool if needed, to pull the single flexible arm 42 through the internal elongate slot 54 of the temple 18, the attaching element 60 may be attached, or hooked, to complementary attaching element 64 to detachably secure and retain the attaching element 60 thereto.

Such a tool for use to install, or tighten, any of the embodiments of the coupling device 40 described herein could be adapted from a number of known devices. For example, in embodiments wherein the attaching element 60 is a through-hole, an appropriate tool could include, but is not limited to, any suitable element having a long thin handle with, e.g., either a small hook, or point (like a ballpoint pen) at one end. Once the coupling device 40 is inserted through the slot 46 and fed through the internal elongate slot 54 of the temple 18, a user would insert the hook-ended tool into the internal elongate slot 54 from the distal end surface 58, insert the hook through the attaching element 60, and pull the coupling device 40 taut, in further embodiments, stretching it over the peg forming the complementary attaching element 64. Alternatively, the single flexible arm 42 of the coupling device 40 itself could be made longer such that the user would need no tool at all and simply pinch and pull the end of the coupling device 40 between two fingers, pulling it taut for installation, and in embodiments, attaching it to the complementary attaching element 64.

In embodiments, the complementary attaching element 64 is positioned at a sufficient distance along the temple 18 to require the single flexible arm 42 to be stretched beyond its nominal length for fixing the attaching element 60 thereto. Accordingly, upon assembly to the frame 12 via the coupling device 40, a tensile force is exerted along the temple 18 between the front end portion 44 positioned against the front surface 48 and the complementary attaching element 64 on the temple 18, which facilitates retention of the abutting end surface 56 of the temple 18 firmly against the front surface 48 of the eyeglass frame 12 when in use in the open position.

In further embodiments, a removable fixing element 65 (see FIG. 4A) may also be provided, such as a cap or other suitable element, which may be placed over the single flexible arm 42 once it is attached to the peg 64, to insure that the single flexible arm 42 remains engaged with the complementary attaching element 64 during use and during repositioning of the temple 18 from the in-use position (see FIG. 1A, e.g.) to the stored position (see FIG. 1B, e.g.).

The complementary attaching element 64 may be formed of a rigid material, for example, of rubber, metal, a metal alloy, or a plastic.

It will be appreciated that conventional eyewear will have a nominal operating angular range of motion that allows approximately ninety degree in-plane (remaining in the x-y plane) rotation around the rotation axis 30 of the temple 18, from the substantially perpendicular orientation to the eyeglass frame 12 as shown in FIG. 1A to a folded closed position, as shown, e.g., in FIG. 1B. It will also be appreciated that conventional hinged eyewear will break, become permanently mis-aligned, or fatally fail, if the temple is over-rotated either around the z-axis outwardly from its in-use position, or out of the x-y plane. In contrast, the flexible, elastic coupling device 40 of the present disclosure is configured to allow over-rotation of the temple 18 in any direction, including outwardly exceeding the 90-degree typical rotation around the axis 30, and out of the x-y plane, i.e., beyond a nominal operating angular range of motion relative to the eyeglass frame, without breakage, or fatal failure, of the temple, coupling device, or eyeglass frame. It is noted that if the temple or coupling device were to fatally fail, i.e., break, they could be easily replaced on the same eyeglass frame.

In preferred embodiments, the eyewear device 10 includes two coupling devices 40, each one of the two coupling devices 40 hingedly coupling a corresponding one of the temples 18 to the eyeglass frame 12 as described and shown herein.

In the embodiments shown, the eyewear device 10 is manufactured for integration with various embodiments of the coupling device 40 of the present disclosure. However, it is also contemplated that the scope of the present disclosure includes an embodiment of the eyewear device 10 formed from a conventional frame appropriately modified, at least along one side 20 of the eyeglass frame 12, for use with a temple 18 of the present disclosure to hingedly couple the temple 18 to the modified conventional frame via an embodiment of the coupling device 40 as described herein. Accordingly, the coupling device 40 of the present disclosure may be used to allow interchangeability of temples in conventional eyewear, and also facilitates repair of conventional eyewear.

For example, in embodiments, any of the embodiments of the abutting end portion 24 formed in accordance with the present disclosure may be configured to be removably attachable to the temple 18, e.g., to the inner-facing surface 66 of the temple 18, via threaded holes and screws, adhesives, or other conventional attaching elements known in the art. It will be appreciated that many types of conventional eyeglass frames may be able to be modified along each side to include the slot 46 therethrough so that the coupling device 40 can then be inserted through both the slot 46 and the internal elongate slot 54 in a removably attachable abutting end portion 24, for hingedly coupling a conventional temple to a conventional eyeglass frame.

Some conventional eyeglass frames may not allow for modification to include the slot 46 extending from the front surface to the rear surface 50 of the side portion 26 of the eyeglass frame. Accordingly, embodiments of the side portion 26 may also be configured to be removably attachable to a conventional eyeglass frame via threaded holes and screws, adhesives, or other conventional attaching elements known in the art.

Accordingly, embodiments of the coupling device for hingedly connecting a temple to a lens frame of the present disclosure may either be incorporated into eyewear, or existing eyewear may be modified to accommodate mounting of the device thereto.

Figure 5A:
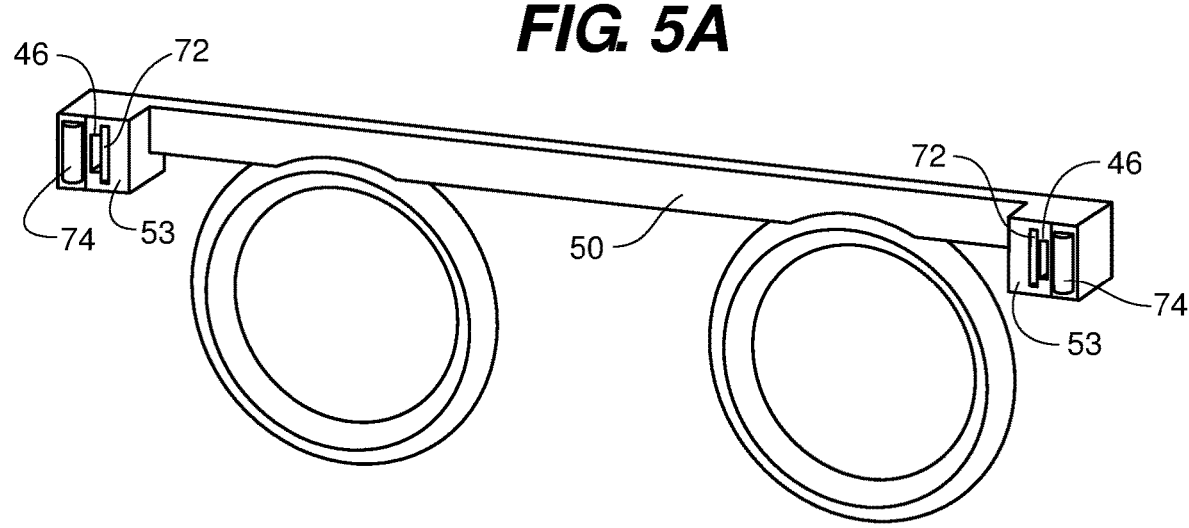
FIG. 5A is a rear view of an embodiment of an eyeglass frame configured for assembly with the temple of FIG. 4A.

Referring again to FIGS. 4A-5B, in further embodiments, the eyewear device 10 may further include one or more pairs of cooperating stabilizing elements, a first stabilizing element 68, 70 of each pair being positioned on the abutting end surface 56 of the temple 18 (FIGS. 4A, 4B) and a second stabilizing element 72, 74, respectively, of each pair positioned on the hinging interface 53 of the eyeglass frame 12 (FIGS. 5A, 5B). The first stabilizing element 68, 70 and the second stabilizing element 72, 74 of each pair is positioned and shaped to mutually engage and cooperate with each other for stable positioning and a snug fit of the temple 18 against the eyeglass frame in the open position. The complementary shapes of each of the mutually engaging first stabilizing element 68,70 and second stabilizing element 72,74, respectively, also allow a smooth repositioning of the temple 18 between the open in-use position shown in FIG. 1A and the closed position for storing, as shown, e.g., in FIG. 1B. The cooperating stabilizing elements may also help facilitate over-rotation of the temple 18 outwardly from its in-use open position, outwardly exceeding the 90-degree typical rotation around the axis 30 in the x-y plane, without breakage, or fatal failure, of the temple 18 or the coupling device 40.

Pairs of cooperating stabilizing elements may also be configured and positioned to allow over-rotation out of the x-y plane without fatal failure.

In the embodiment of FIGS. 4A-5B, for example, a first pair of cooperating stabilizing elements includes the first stabilizing element 68, also referred to in the particular embodiment shown as "inner stabilizing element" 68, which is positioned on the abutting end surface 56 of the abutting end portion 24 of the temple 18, and the second stabilizing element 72 of the pair, also referred to in the particular embodiment shown as "inner complementary stabilizing element" 72, positioned on the hinging interface 53 of the eyeglass frame to cooperate and engage therewith for stable positioning of the temple 18 in the in-use open position, and smooth repositioning of the temple 18 between the open in-use position and the closed position for storing.

Referring still to FIGS. 4A to 5B, in further embodiments, the abutting end surface 56 includes an indentation or pocket 57 in an inner-facing portion of the abutting end surface 56 intersecting the slot 54 and extending along an inner-facing side 66 of the end portion 24. The pocket 57 allows the temple 18 via the coupling device 40 to bend within the pocket 57 when rotating the temple 18 around the inner stabilizing element 68 and thus avoid inordinate stretching of the coupling device 40 when rotating the temple 18 to the closed position. Accordingly, the pocket 57 allows the coupling device 40 to achieve a tension in the closed position similar to that in the open position.

In the particular embodiment of FIGS. 4A-5B, the eyewear device 10 further includes a second pair of cooperating stabilizing elements, which includes the first stabilizing element 70 of the second pair, also referred to in the particular embodiment shown as "outer stabilizing element" 70, positioned on the abutting end surface 56 of the abutting end portion 24 of the temple 18, and the second stabilizing element 74, also referred to in the particular embodiment shown as "outer complementary stabilizing element" 74, positioned on the hinging interface 53 of the eyeglass frame.

Figure 5B:
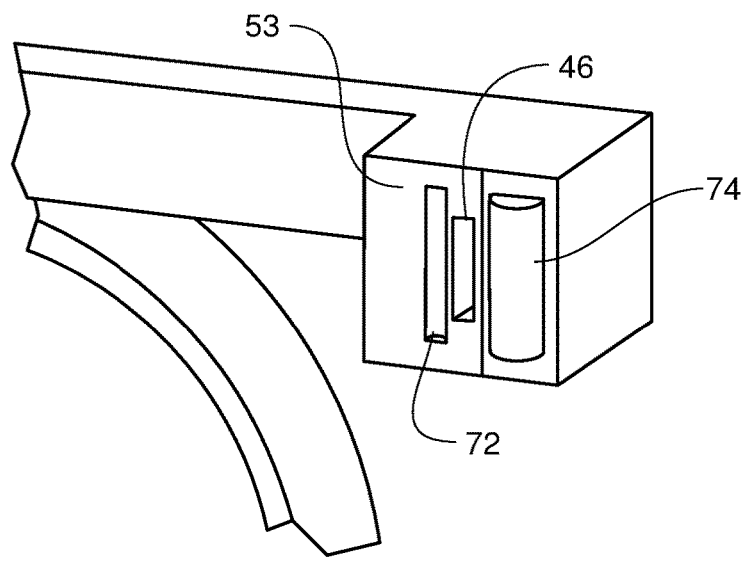
FIG. 5B is a close-up view of one side of the eyeglass frame of FIG. 5A.

In further embodiments, as shown, the inner stabilizing element 68 and the outer stabilizing element 70 (the first stabilizing elements of the first and second pair of cooperating stabilizing elements, respectively), are positioned along opposing sides of the internal elongate slot 54 of the temple 18, and referring to FIGS. 5A and 5B, the inner complementary stabilizing element 72 and the outer complementary stabilizing element 74 (the second stabilizing elements of the first and second pair of cooperating stabilizing elements, respectively), are shaped and positioned on the rear surface 50 of the side portion 26, i.e., on the hinging interface 53, of the eyeglass frame 12, along opposing sides of the slot 46 in the eyeglass frame 12, to mutually engage with the inner stabilizing element 68 and the outer stabilizing element 70, respectively.

In particular embodiments, these pairs of cooperating stabilizing elements, as with any of the other aspects and embodiments described herein for hingedly coupling temples 18 to the eyeglass frame 12, are provided for each of the two temples 18 of the eyewear device 10 and on the hinging interface 53 of each side 20 of the eyeglass frame 12.

Still referring to FIGS. 4A-5B, in embodiments, one of the cooperating stabilizing elements in the pair is a protruding element, which may be a protruding cylindrical surface as shown, and the other of the pair is a recessed channel having a complementary shape, for example, a complementary-shaped cylindrical channel or indentation as shown in FIGS. 4A-5B. As an example, the recessed channel, e.g., first stabilizing element 70, is sized and shaped to rotatably guide the protruding element, e.g., second stabilizing element 74, therein between an open and a closed position of the eyewear device 10. The first 70 and second stabilizing element 74 are shaped such that the abutting end surface 16 of the temple 18 rests snug and flat against the hinging interface 53 of the eyeglass frame 12 in the open position, as with conventional eyewear. In particular embodiments, such as that shown in FIGS. 4A-5B, each of the cooperating stabilizing elements in the pair has a cylindrical axis aligned along the vertical axis 30 of rotation of the temple 18 on the eyeglass frame 12 to allow stable rotation of the temple 18 around the cylindrical axis between the open in-use position and the closed position for storage.

In the particular embodiment shown in FIGS. 4A-5B, the abutting end surface 56 of each temple 18 of the eyewear device 10 has a protruding cylindrical-shaped inner stabilizing element 68 that cooperates with the inner complementary stabilizing element 72, which is a cylindrically-shaped channel, on the hinging interface 53 abutting the temple 18. As shown and described, the pocket 57 may extend from the slot 54 and into the inner stabilizing element 72 to facilitate rotation of the coupling device 40 and temple 18 to the closed position.

An additional pair of cooperating stabilizing elements may be provided for stabilizing the temple 18 in the in-use position as well as stabilizing outward movement of each temple 18. In the particular embodiment shown, for example, the abutting end surface 56 of each temple 18 has a recessed channel of cylindrical-shape providing the outer stabilizing element 70, which cooperates with the outer complementary stabilizing element 74, which is a cylindrically-shaped protrusion, on the hinging interface 53 of the eyeglass frame 12 abutting the temple 18. One can appreciate that the vertically-aligned cylindrical shape of the second (outer complementary) stabilizing element 74 allows the temple 18 to over-rotate more than 90 degrees outward from its nominal in-use position, without fatal failure, and further promotes easy and quick reseating and alignment of the temple 18 back onto the hinging interface 53 of the eyeglass frame 12.

As can be seen in FIGS. 4A-5B, in embodiments, the first pair of cooperating stabilizing elements proximate the inner-facing side 66 of the temple 18 (the inner stabilizing element 68 and inner complementary stabilizing element 72) may, in embodiments, be formed with a smaller cross-sectional diameter than the second pair of cooperating stabilizing elements proximate the outward-facing side of the temple 18 (the outer stabilizing element and inner complementary stabilizing element 74).

One can appreciate that each pair of cooperating stabilizing elements may be configured with suitably complementary shapes and sizes to snuggly fit together, one of each pair being recessed below either the abutting surface 56 of the temple 18 or below the hinging interface 53, such that the abutting surface 56 of the temple 18 rests flatly and securely against the hinging interface 53 in the open position. Unlike conventional eyewear, while the cooperating stabilizing elements of the present disclosure may allow the temples 18 to over-rotate outwardly or out of the plane of rotation, the elastic construction of the coupling device 40 minimizes, and may eliminate, fatal failure of the temple 18 or eyeglass frame 12 due to such over-rotation.

Figure 6A:
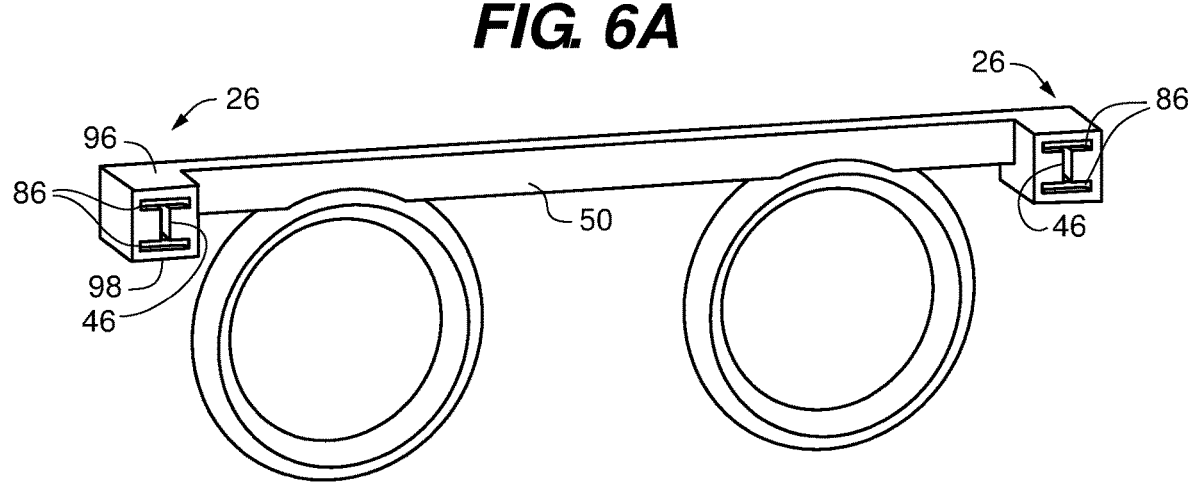
FIG. 6A is a rear view of another embodiment of an eyeglass frame.
Figure 6B:
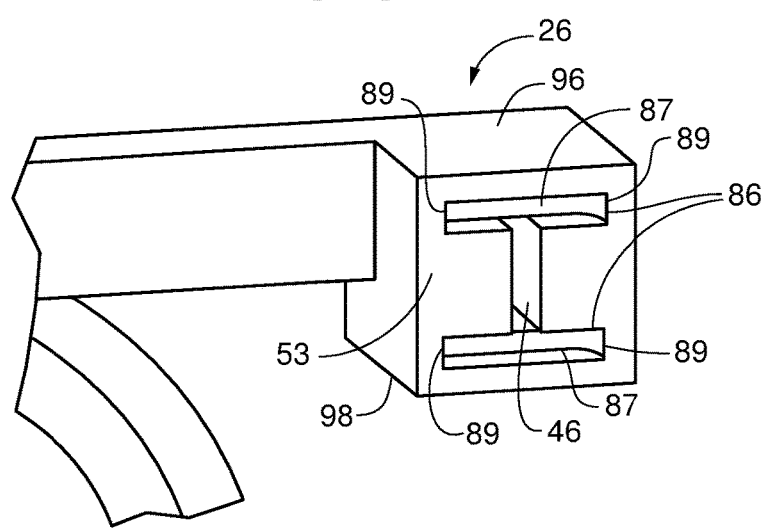
FIG. 6B is a close-up view of one side of the eyeglass frame of FIG. 6A.
Figure 7A:
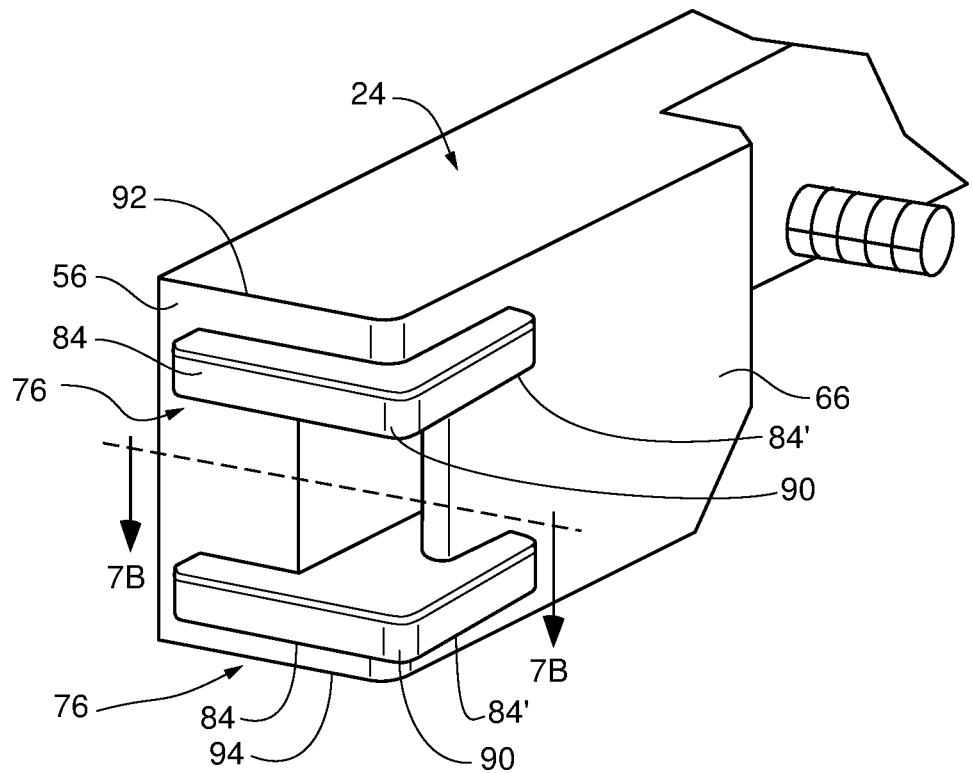
FIG. 7A is a pictorial representation of an abutting end portion of an embodiment of a temple configured for assembly on the right side of the eyeglass frame of FIG. 6A.
Figure 7B:
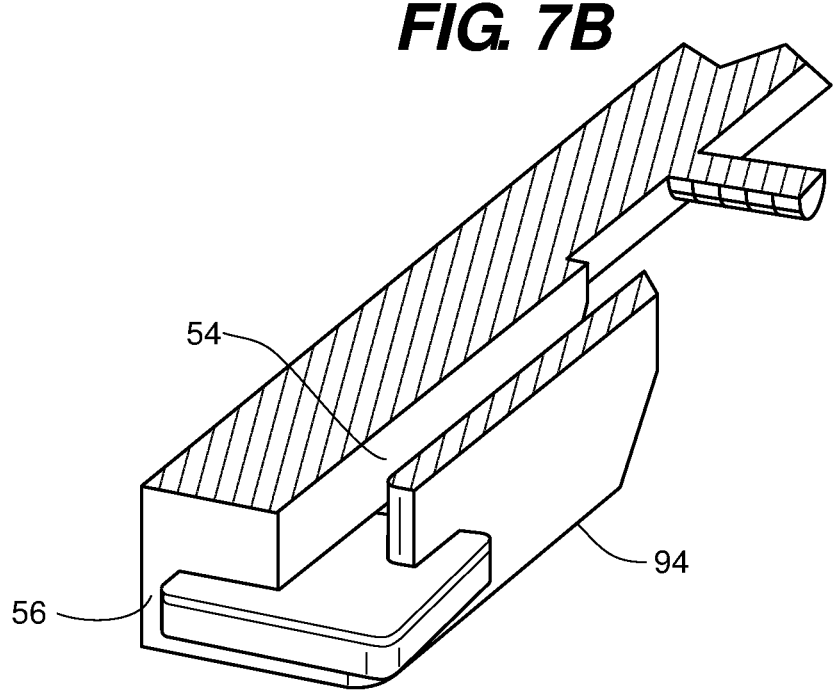
FIG. 7B is a view of the abutting end portion of FIG. 7A sliced along a horizontal plane.
Figure 8:
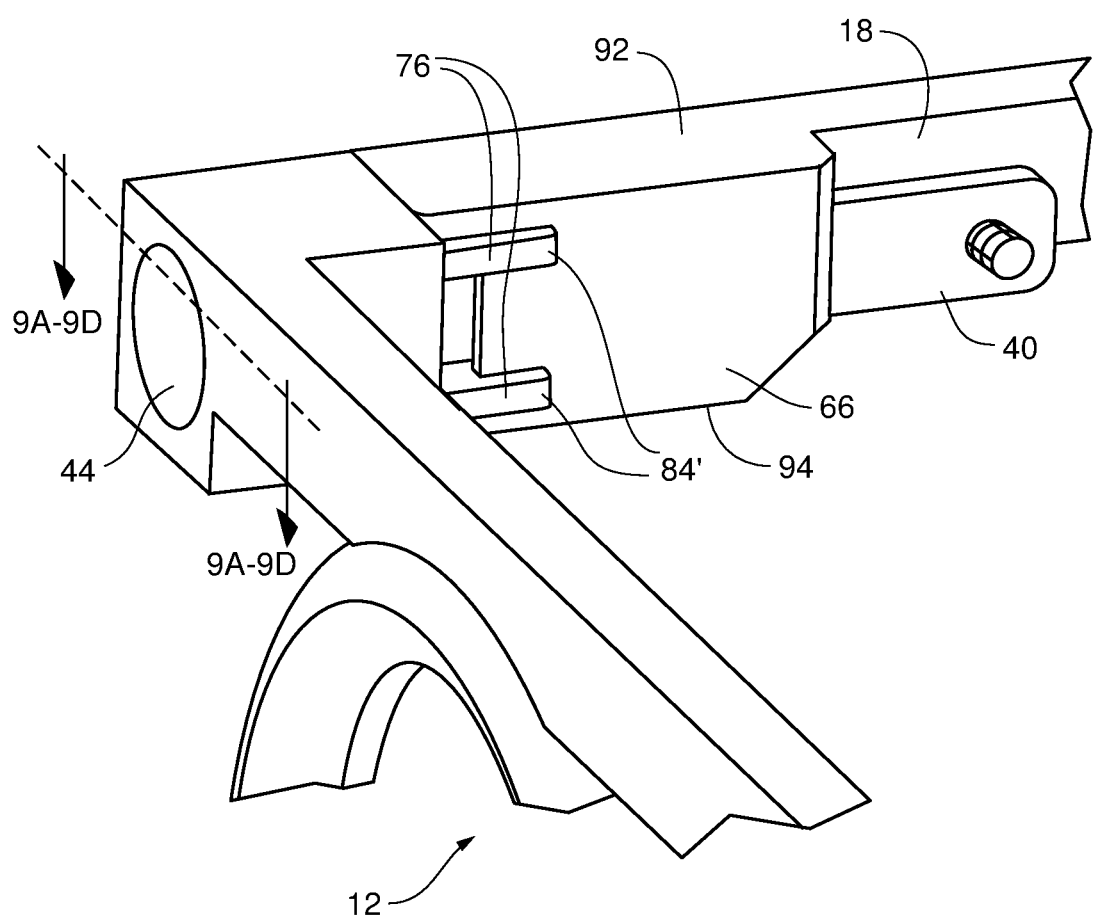
FIG. 8 is a pictorial representation of a portion of the temple of FIG. 7A assembled via an embodiment of a coupling device to a right side of the eyeglass frame of FIG. 6A.

Referring to FIGS. 6A-9B, further embodiments of cooperating stabilizing elements of the present disclosure may include a first stabilizing element 76 located on the abutting end portion 24 of the temple 18, as best shown in FIG. 7A, which includes a portion 84 located on the abutting end surface 56 and an inner-facing portion 84' positioned along the inner-facing surface 66 of the abutting end portion 24 of the temple 18. For example, as shown in FIG. 7A, the first stabilizing element 76 may be a corner portion of a right rectangular prism, with one side of the rectangular prism protruding from the inner-facing surface 66 and an adjacent perpendicular side protruding from the abutting end surface 56 of the temple 18.

Referring to FIGS. 6A and 6B, the second (complementary) stabilizing element 86 of the pair is positioned on the hinging interface 53 of the eyeglass frame 12, and has a complementary-shaped channel 87 recessed into the hinging interface 53, which is shaped to cooperate and engage with the stabilizing element 76 for stably repositioning the temple over the angular range of motion between the open in-use position and the closed position. In embodiments, the channel 87 forming the second stabilizing element 86 also includes terminating walls 89. One will appreciate that the terminating walls 89 of the channel 87 form detent stops which cooperate with the portion 84 of the first stabilizing element 76 to hold, or lock, the temple 18 when rotated via the channel 87 into the open position. Once properly seated and locked in the in-use position, the temple 18 may be disengaged from this open position by exerting a rotational force. Likewise, the terminating walls 89 form detent stops which cooperate with the portion 84' of the first stabilizing element 76 to hold, or lock, the temple 18 when rotated via the channel 87 into the closed position.

Accordingly, as exemplified in the embodiment of FIGS. 6A-9D, the portion 84 on the abutting end surface 56 and the portion 84' of the first stabilizing element 76 extending along the inner-facing surface 66 of the temple 18 may be appropriately shaped to form a pair of locking tabs and the second stabilizing element 86 may in the shape of a notch 88 (formed, e.g., by the channel 87 with terminating walls 89), which is configured to seat each of the locking tabs therein. As shown in FIGS. 9A-9D, for example, the temple 18 may be forcibly rotated out of the open position of FIG. 9A, the first stabilizing element 76 being guided within the channel 87 of the second stabilizing element 86 while being rotated as shown in FIGS. 9B and 9C, and then stably reseated and held in the stored position, shown in FIG. 9D. In particular, a portion 84 of the first stabilizing element 76 protruding from the abutting end surface 56 may form a first tab of a pair of locking tabs, and is seated in the notch 88 in the open in-use position, and an inner-facing portion 84' protruding from the inner-facing surface 66 may form a second tab of the pair of locking tabs, which is seated in the notch 88 in the stored position.

In the embodiments shown in FIGS. 7A-9D, the locking tabs are provided by appropriately configuring the shape of the first stabilizing elements, in particular, with rectangularly shaped protrusions positioned along the abutting end surface 56 and the inner-facing surface 66, respectively, of the abutting end portion 24 of the temple 18. The second stabilizing element 86 is formed with a notch 88, in this particular embodiment, a rectangular indentation formed from the channel 87 and terminating walls 89, which is shaped and dimensioned to snugly receive and seat each of the portions 84, 84' forming the pair of locking tabs therein.

In further embodiments, described below in reference to the embodiment of FIGS. 10A-10B, for example, a pair of locking tabs for holding the temple 18 in each of an open and closed position are provided as additional protrusions on each of a portion of the first stabilizing element 76 on the abutting end surface 56 and inner-facing surface 66, respectively.

Referring to FIG. 7A, the portion 84 and inner-facing portion 84' forming the first stabilizing element 76, in further embodiments, are joined by a curved corner section 90 that facilitates rotation of the temple 18 between in-use and stored positions.

Still referring, for example, to FIGS. 6A and 7A, the eyewear device 10, as described herein above, may include two pairs of cooperating stabilizing elements, with each of the first stabilizing element 76 of the first and second pair positioned proximate to an upper edge 92 and a lower edge 94 of the abutting end portion 24, respectively, on opposing sides of the internal elongate slot 54. Correspondingly, the second stabilizing element 86 of the first and second pair are positioned proximate an upper 96 and lower edge 98 of the side portion 26 of the eyeglass frame 12, respectively, on opposing sides of the slot 46.

Figure 9A:
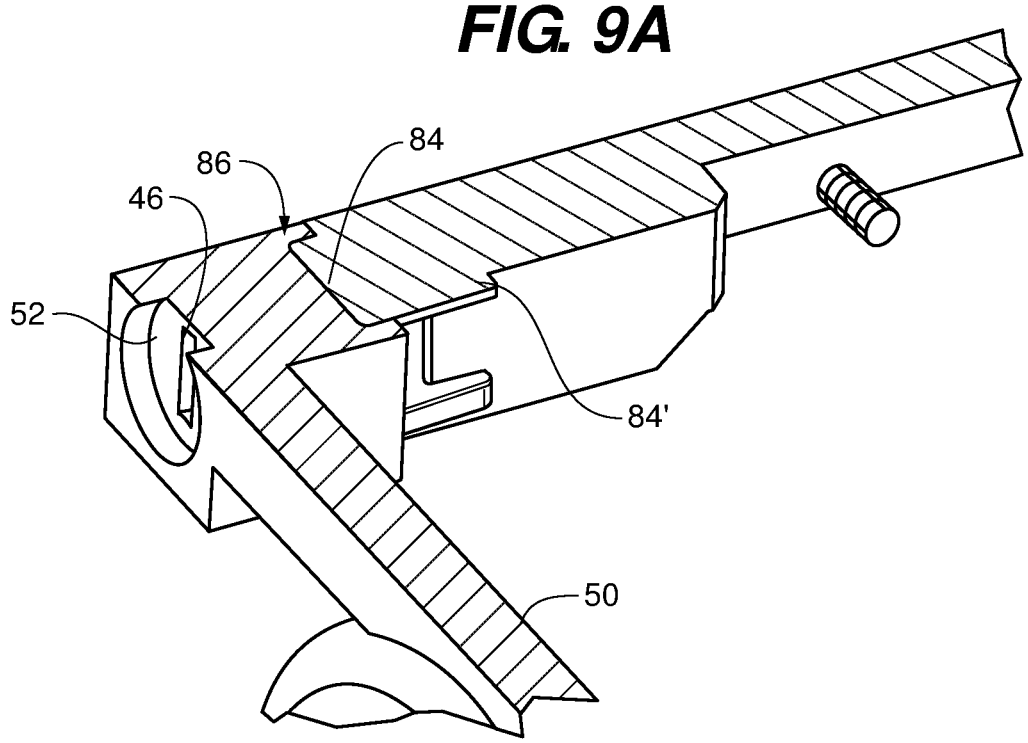
FIG. 9A represents a horizontal slice of the portion of the eyewear shown in FIG. 8, in an open-in use position (shown without the coupling device for clarity).
Figure 9B:
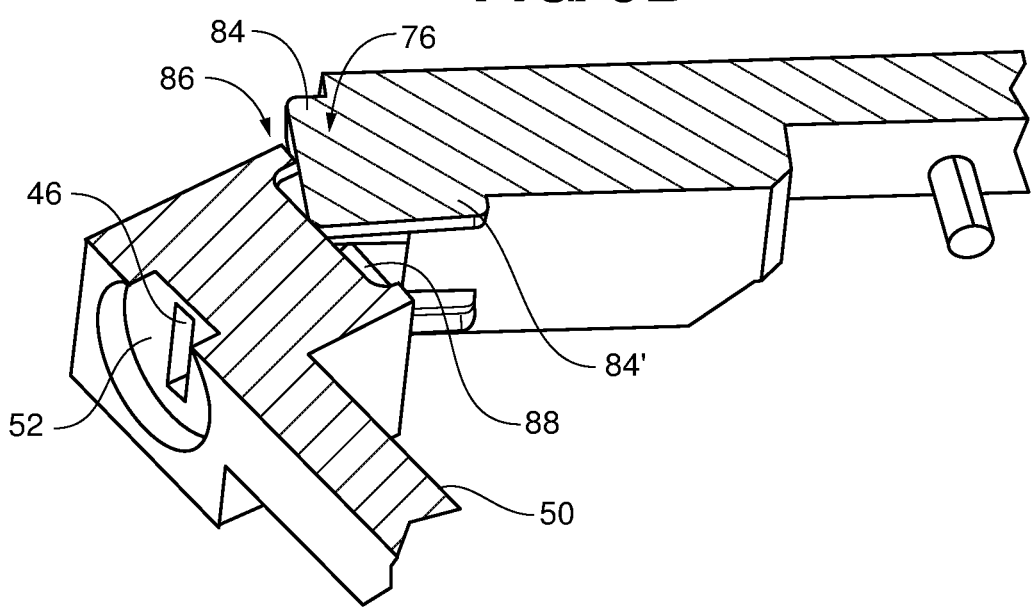
FIGS. 9B and 9C are views of the horizontal slice of FIG. 9A, with the temple inwardly rotated about 30 degrees and 60 degrees, respectively, from the open in-use position.
Figure 9C:
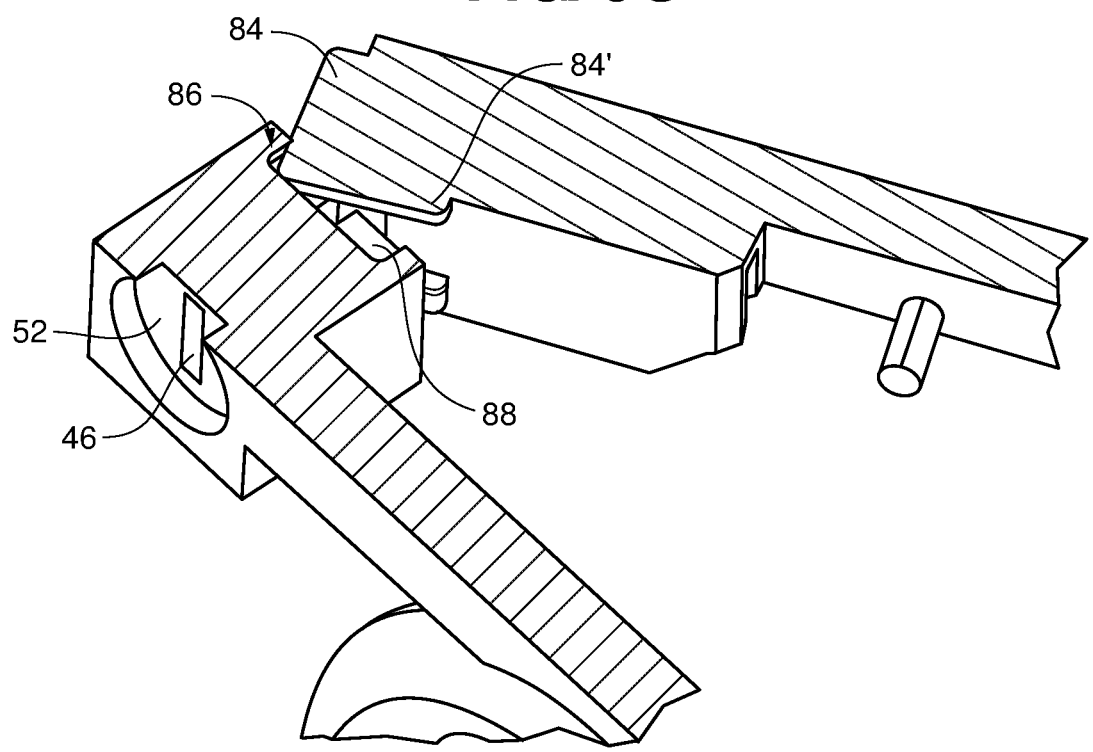
Figure 9D:
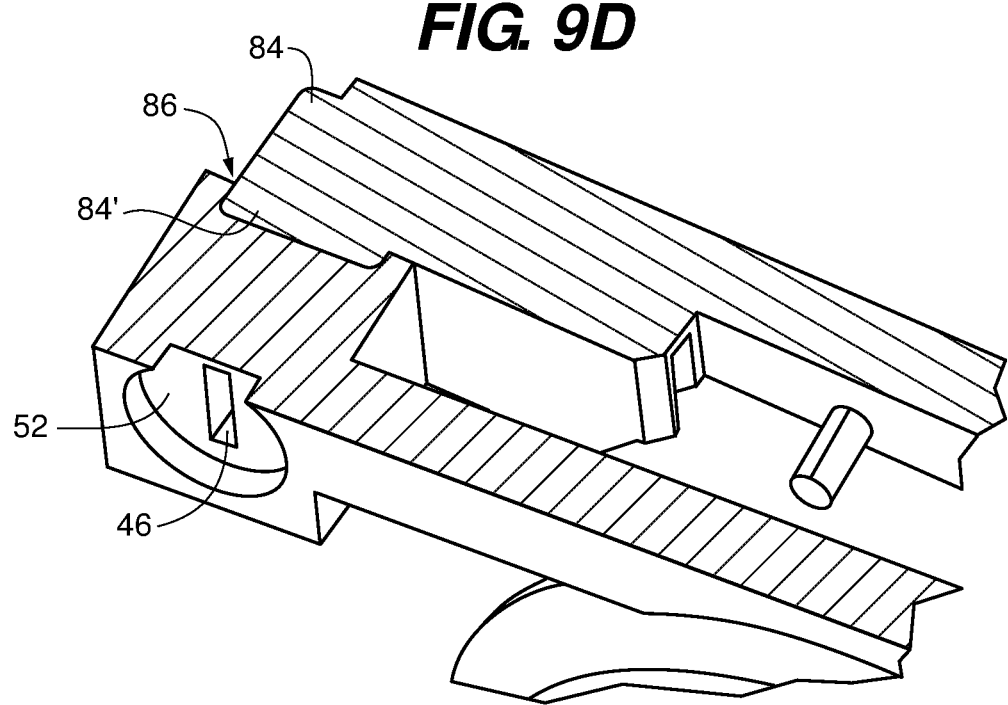
FIG. 9D is a view of the horizontal slice of FIG. 9A, with the temple rotated and held the closed position for storage.
Figure 9E:
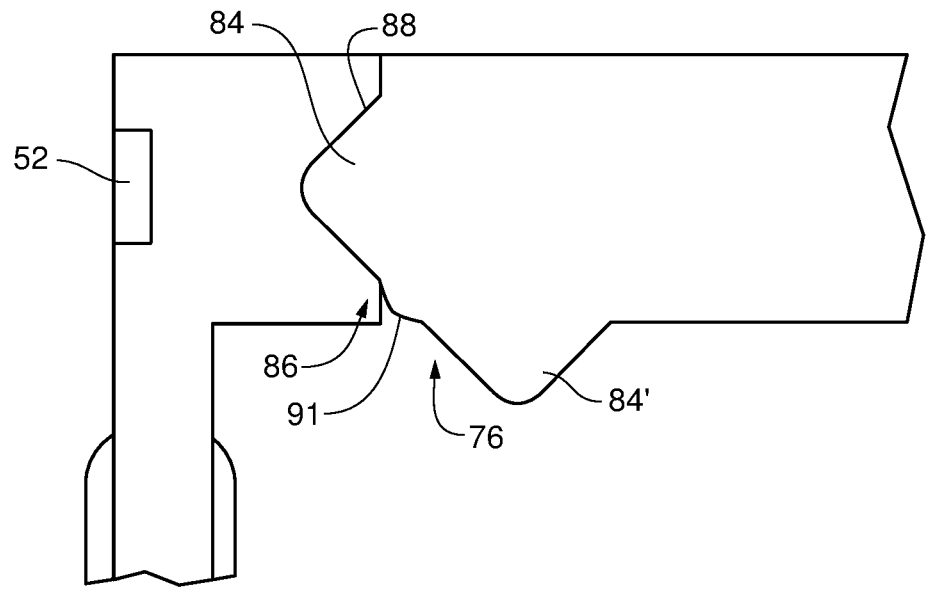
FIGS. 9E and 9F are top views of a horizontal slice of a portion of another embodiment of eyewear in an open and a closed position, respectively.
Figure 9F:
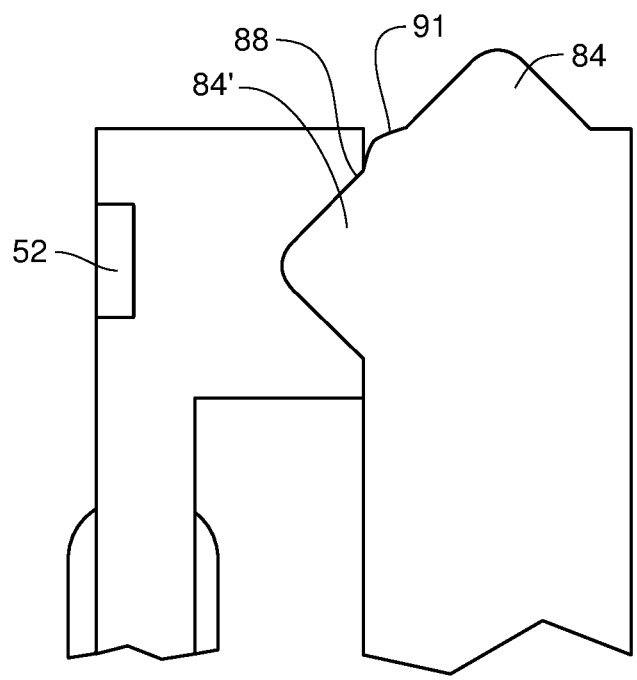

Numerous other shapes and configurations of pairs of stabilizing elements and locking tabs are contemplated to be within the scope of the disclosure. As another example, referring to the embodiments of FIGS. 9E and 9F, and of FIG. 9G, the first stabilizing element 76 may include triangular shaped portions 84, 84' and the second stabilizing element 86 includes a triangularly-shaped notch 88 for engaging and holding each of the portions 84, 84' in an open position (FIG. 9E) and closed position (FIG. 9F), respectively. In the embodiment of FIGS. 9E, 9F, a separate nub-shaped tab 91 protrudes from the stabilizing element 76, between each of the portions 84, 84', providing a detent stop that resists rotation of the temple 18 out of the seated open and stored positions. The nub-shaped tab 91 rests on the hinging interface 53 of the eyeglass frame 12 when the temple 18 is in the open and stored position.

Figure 10A:
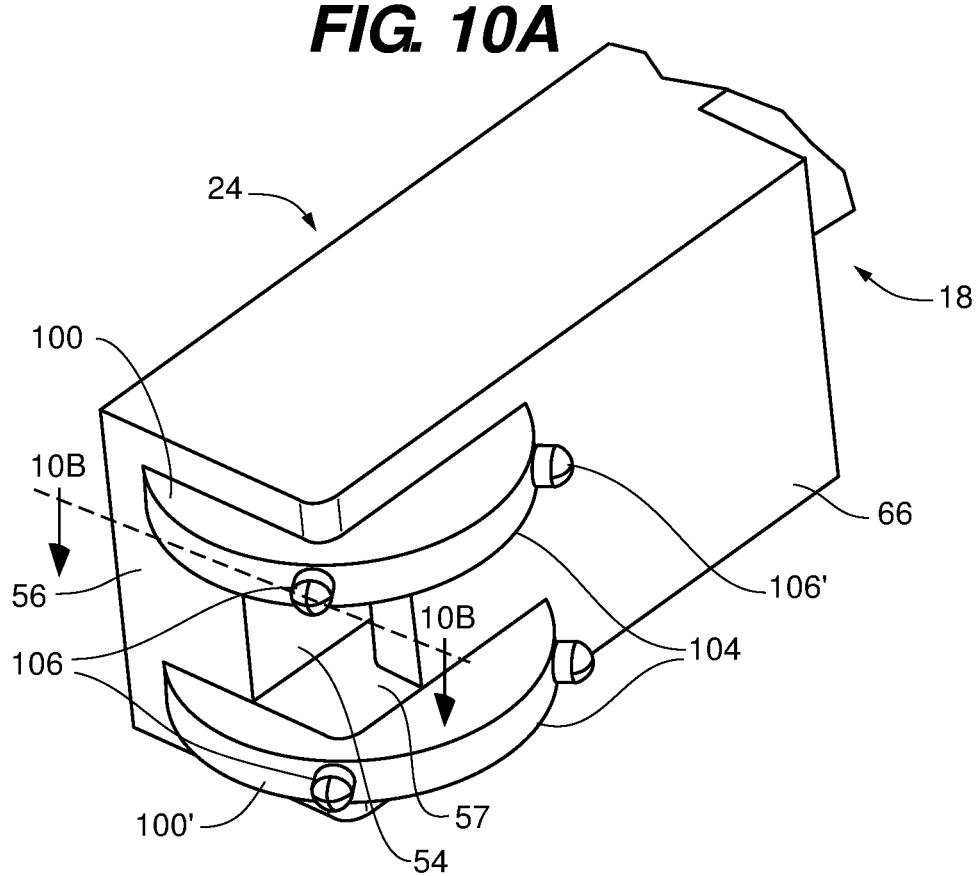
FIG. 10A is a pictorial representation of an abutting end portion of yet another embodiment of a temple of the present disclosure for assembly on the right side of an eyeglass frame.
Figure 10B:
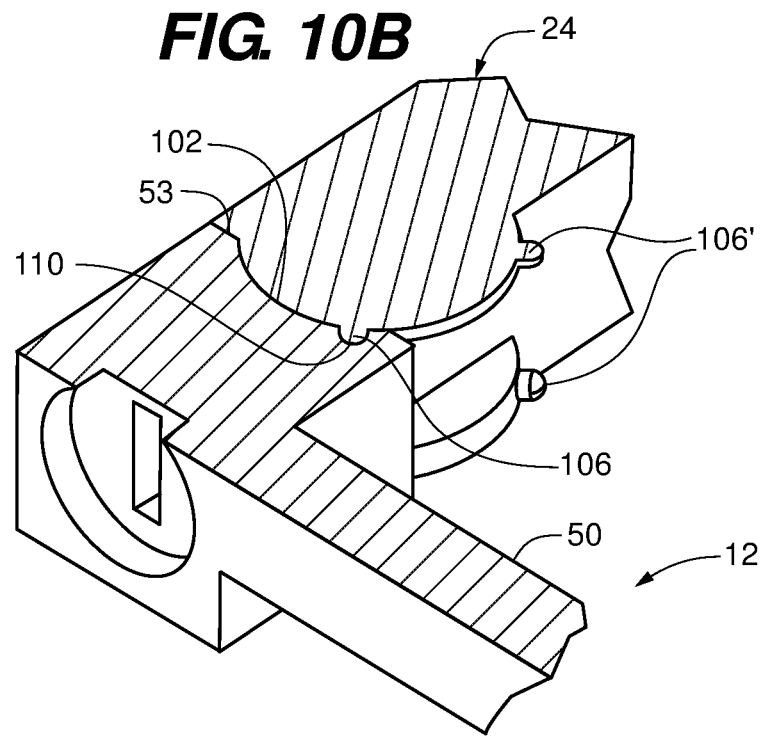
FIG. 10B is a view of a portion of the temple of FIG. 10A assembled with an embodiment of an eyeglass frame of the present disclosure, sliced along a horizontal plane.

FIGS. 10A and 10B depict another embodiment of a pair of cooperating stabilizing elements, a first stabilizing element 100 of the pair positioned on the abutting end surface 56 of the temple 18 and a second stabilizing element 102 of the pair being positioned on the hinging interface 53 portion of the rear surface 50 of the eyeglass frame 12 shaped and positioned to mutually engage for stable repositioning of the temple 18 between the open in-use position and the closed position for storing.

The first stabilizing element 100 in this embodiment includes a protruding curved portion of a cylindrical slice 104 protruding from the abutting end surface 56 and the inner-facing surface 66 of the abutting end portion 24 of the temple 18, wherein an axis of the cylindrical slice is positioned along a vertical axis 30 of the eyeglass frame 12. The second stabilizing element 102 includes an indented concave portion in the hinging interface 53 of the eyeglass frame 12 shaped for smooth rotation and repositioning of the temple 18 and for seating the protruding curved portion of the cylindrical slice 104 therein.

Referring still to FIGS. 10A and 10B, in further embodiments, the first stabilizing element 100 further includes a pair of locking tabs, first tab 106, and second tab 106', which are configured for engaging a notch 110 in the hinging interface 53 of the eyeglass frame 12 in the open in-use position and the stored position, respectively. As shown, the first tab 106 and the second tab 106' protrude from two angularly separated positions along the protruding curved portion 104 for engaging the notch 110 in the open in-use position and the stored position, respectively.

In embodiments of the eyewear device 10, particularly including various embodiments of stabilizing elements with and without additional locking tabs, the reseating of the temple 18 from the in-use to the stored position is facilitated by the elasticity of the coupling device 40, which allows stretching, as well as flexing or bending of the device 40. Preferably, the body of the coupling device 40 is sufficiently elastic to allow the temple 18 to be rotated via the single flexible arm 42 to disengage the first tab 106, for example, from the notch 110, for flexibly hinging the temple 18 to engage the second tab 106' in the notch 110 in the stored position, without inducing additional tension on the temple 18.

The body of the coupling device 40 is also configured with sufficient elasticity to allow over-rotation of the temple in any direction beyond a nominal operating angular range of motion relative to the eyeglass frame without breakage of the temple or the coupling device, as described herein. In embodiments, the elasticity of the coupling device 40 is sufficiently high to secure the temple 18 to the eyeglass frame, but low enough to allow a temple 18 that has suffered inordinate bending moments and directions to instantly return to nominal use by retightening the coupling device 40, for example, by reattaching the attaching element 60 to the complementary attaching element 64 when such bending moment have caused them to separate. Similarly, if actual breakage of the temple 18 or coupling device 40 were to occur, either or both are easily replaceable. In conventional eyewear, such temple movement would cause a pair of eyeglasses with pinned metal hinges to fatally fail.

In embodiments, the coupling device is formed of an elastic or elastomer material.

In further embodiments, the coupling device may be formed from a rubber, such as but not limited to, natural rubber and neoprene rubber.

In other embodiments, the coupling device may be formed from a thermoplastic elastomer material.

The shape and material construction of the coupling device 40 preferably provide significant resistance to bending moments, particularly out of the x-y plane, so that the temple 18 remains in proper position.

As described supra, in embodiments, the cross-sectional fit between the single flexible arm 42 and the internal elongate slot 54 in the temple 18, in embodiments, is sufficiently tight to provide an interference fit upon assembly of the coupling device 40.

Referring to FIGS. 11A-11B, 12A and 12B, further embodiments of the eyewear device 10 requiring no additional complementary attaching element 64, may include an embodiment 140 of the coupling device 40 which includes a single flexible arm 142 having at least one frictional element 144 along one of its lengthwise (longitudinally-aligned along the y-axis) surfaces 145.

Figure 11A:
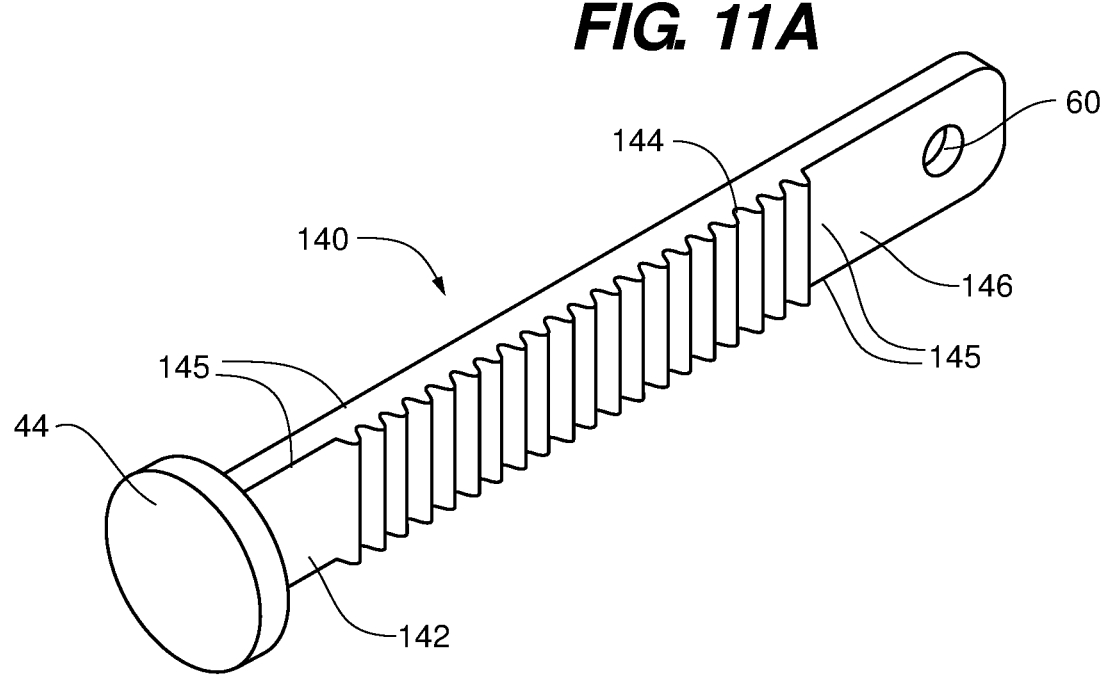
FIG. 11A is pictorial representation of another embodiment of a coupling device of the present disclosure configured for installation of a temple on a right side of an eyeglass frame.

In the embodiment shown in FIG. 11A, for example, the lengthwise surface 145 including the at least one frictional element 144 is an inner-facing surface 146 of the single flexible arm 142, as shown.

Figure 12A:
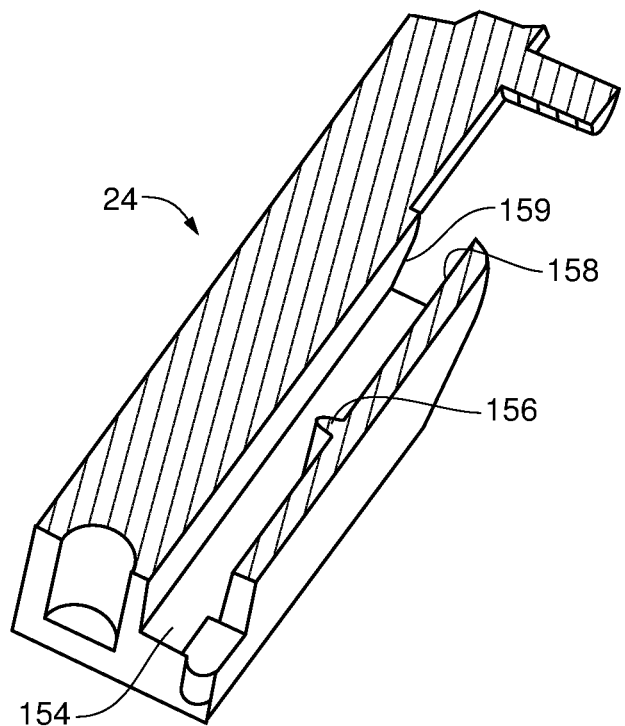
FIG. 12A is a view of an embodiment of an abutting end portion of a temple, sliced along a horizontal plane (the same plane 4B as shown, e.g., for the embodiment of FIG. 4A) for assembly via the coupling device of FIG. 11A.
Figure 12B:
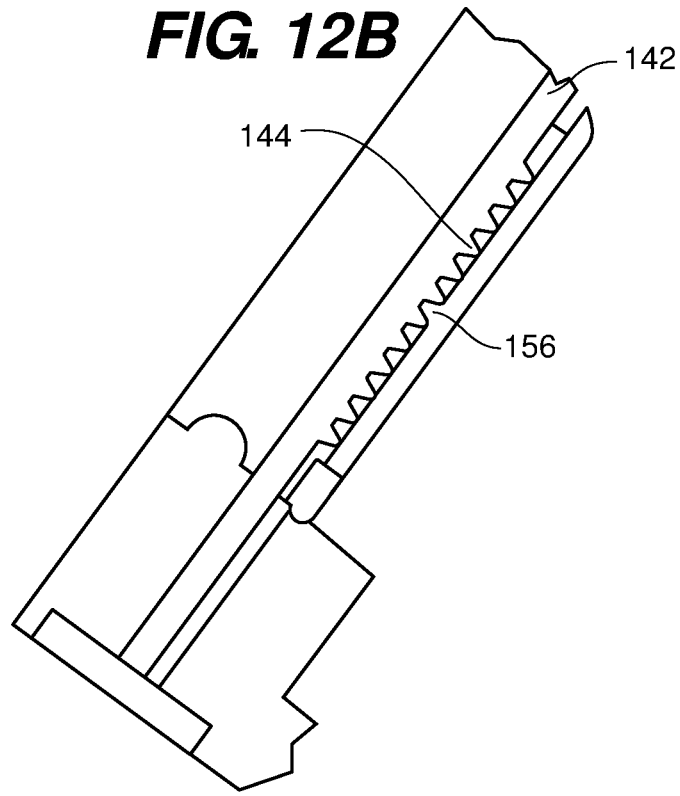
FIG. 12B is a top view of the horizontal slice of the temple of FIG. 12A assembled with an embodiment of an eyeglass frame of the present disclosure via the coupling device of FIG. 11A.

In further reference to FIG. 12A together with FIG. 11A, an embodiment 154 of the internal elongate slot in the abutting end portion 24 of the temple 18 includes at least one complementary frictional element 156 positioned along an opposing surface 158 to the inner-facing surface 146, i.e., the lengthwise surface 145 in FIG. 11A that includes the frictional element(s) 144. Referring also to FIG. 12B, the at least one frictional element 144 and the at least one complementary frictional element 156 are shaped and positioned to frictionally engage with each other upon installation, and to detachably retain the temple 18 to the eyeglass frame 12 via the single arm 142 of the coupling device 140.

Figure 11B:
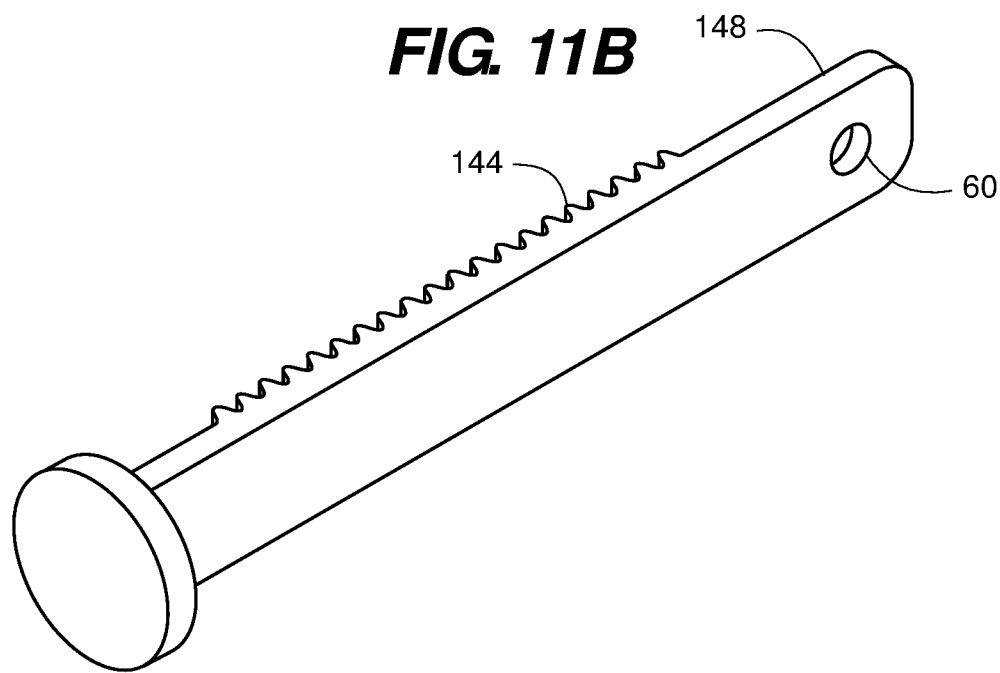
FIG. 11B is a pictorial representation of yet another embodiment of a coupling device of the present disclosure configured for installation of a temple on a right side of an eyeglass frame.

It will be appreciated that alternative embodiments may include the frictional elements 144 on a different lengthwise surface 145 of the coupling device 140, such as on an outer-facing surface 148 of the single flexible arm 142 as shown in FIG. 11B, in which case a corresponding opposing surface 159, referring to FIG. 12A, would include the complementary frictional element(s) 156 to frictionally engage with the at least one frictional element 144 on the outer-facing surface 148 upon installation.

Figure 13A:
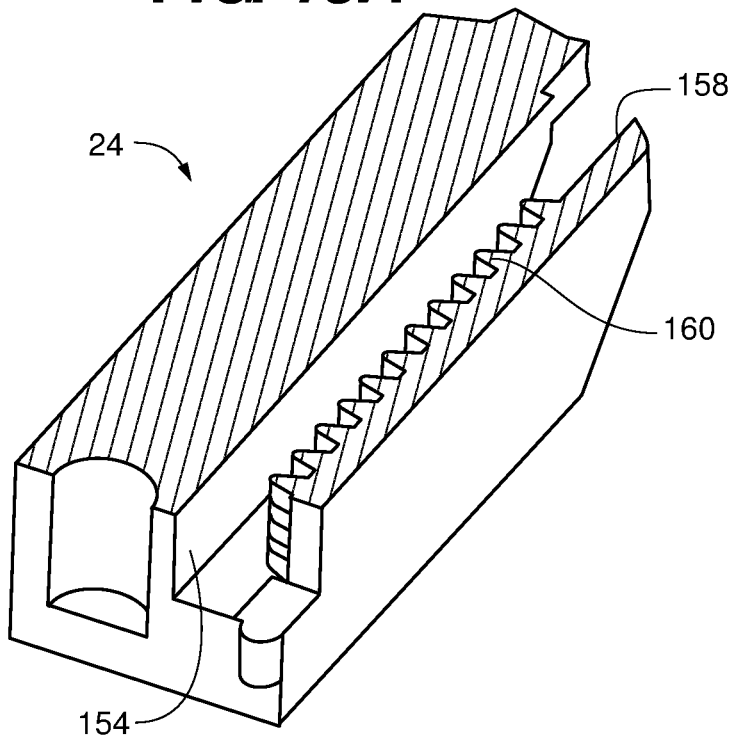
FIG. 13A is another embodiment of an abutting end portion of a temple, sliced along a horizontal plane (like the plane 4B as shown, e.g., for the embodiment of FIG. 4A) for assembly via the coupling device of FIG. 11A.
Figure 13B:
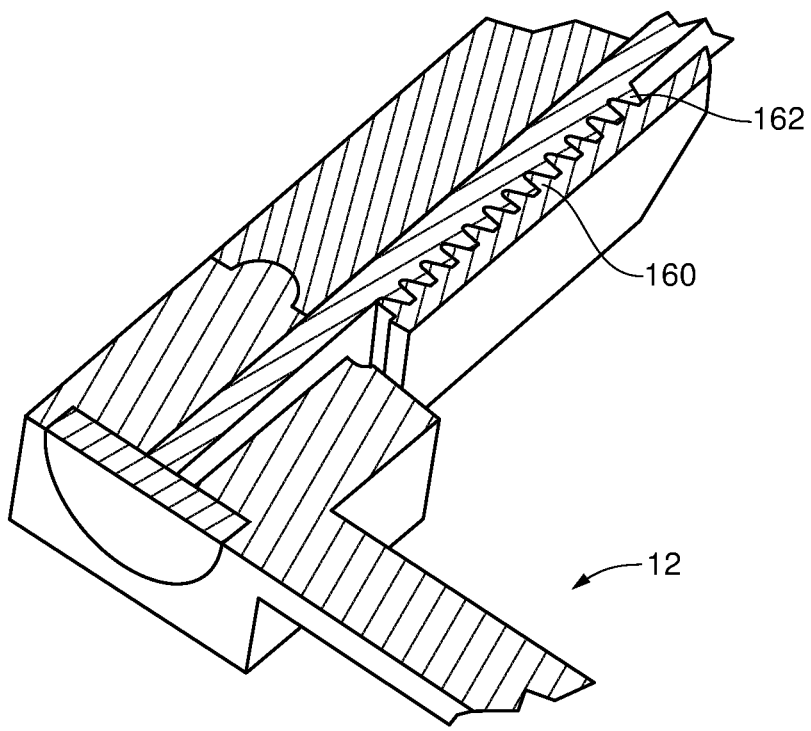
FIG. 13B is a top view of the horizontal slice of the temple of FIG. 13A assembled with an embodiment of an eyeglass frame of the present disclosure via the coupling device of FIG. 11A.
Figure 14:
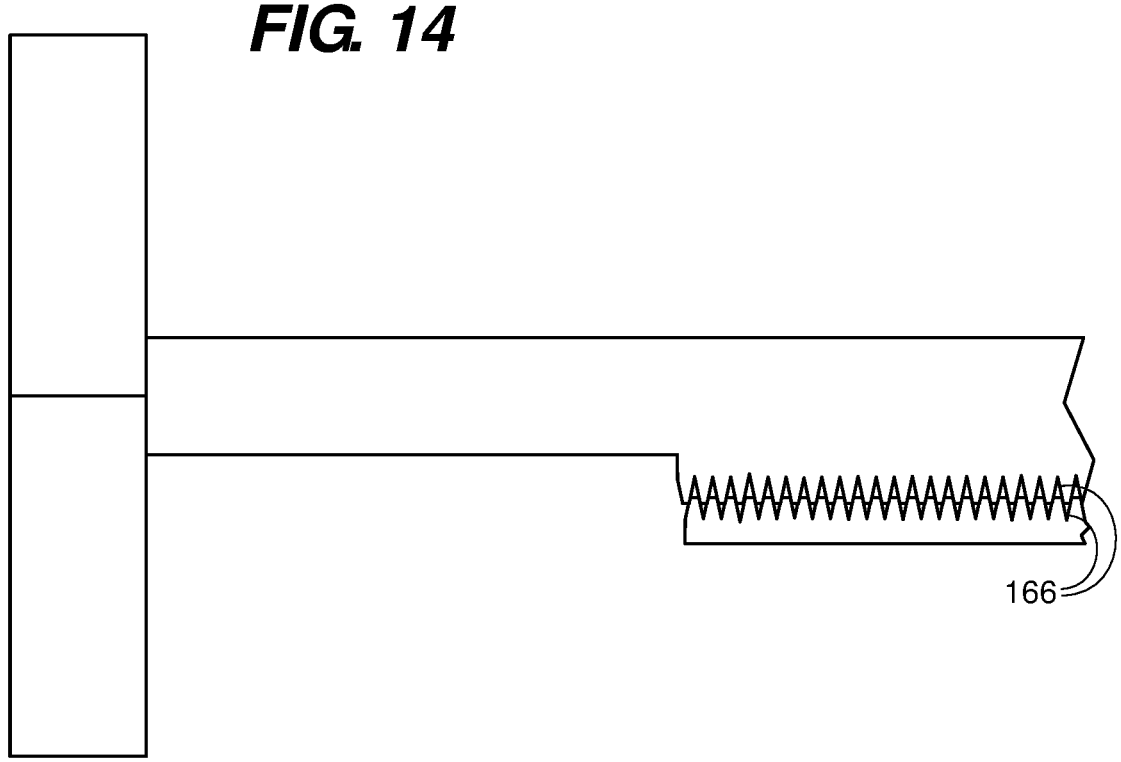
FIG. 14 is a top view representation of the slice shown in FIG. 13B for another embodiment of frictional elements engaging with complementary frictional elements upon assembly.

It will also be appreciated that the frictional element(s) 144 and complementary frictional element(s) 156, may be in the form of teeth of the same or different shape, and may be, for example, formed as rounded nubs 160, as shown in FIG. 13A, or as angled, sharp-edged teeth 162 as shown in FIG. 13B (having nubs 160 engaging with angled teeth 162) and in FIG. 14, where both the frictional elements and complementary frictional elements are angled teeth 166. The teeth may, in embodiments, be regularly, or equally, spaced.

In embodiments, the frictional element(s) 144 and complementary frictional element(s) 156 may be any suitable granulated-type surface.

The embodiments represented in FIGS. 11A-14 minimizes the need for a tight fit between the single flexible arm and the elongated internal slot of the temple. It will also be appreciated that installation and removal of the embodiments of a coupling device represented in FIGS. 11A-14 will be analogous to that described for particular embodiments described supra in reference to FIG. 4A, in that stretching the single flexible arm 142 will flatten its profile, allowing the frictional elements to disengage for installation, and also for removal, of the coupling device.

Referring again to FIG. 11A, in embodiments, the single flexible arm 142 includes a plurality of regularly spaced teeth 144 on one of the lengthwise surfaces 145, e.g., the inner-facing surface 146 of the coupling device 140.

Referring also to FIGS. 13A and 13B, in further embodiments, the opposing surface 158 of the internal elongate slot 154 of the abutting end portion 24 includes a plurality of complementary teeth 160 configured to mesh with the regularly spaced teeth 144 to detachably retain the temple 18 to the eyeglass frame 12 upon installation.

As described herein, the body of the single flexible arm, which may include one or more frictional elements, are preferably formed of an elastically deformable material, e.g., an elastic or elastomer material, and may be formed of rubber, such as but not limited to, natural rubber and neoprene rubber, or a thermoplastic elastomer material.

In embodiments, the at least one complementary frictional element 160 may be formed of the same material as the frictional elements 144. In other embodiments, the complementary frictional element(s) 160 may be formed of metal, a metal alloy, or a plastic.

While the invention has been particularly shown and described with reference to specific embodiments, it should be apparent to those skilled in the art that the foregoing is illustrative only and not limiting, having been presented by way of example only. Various changes in form and detail may be made therein without departing from the spirit and scope of the invention. Therefore, numerous other embodiments are contemplated as falling within the scope of the present invention as defined by the accompanying claims and equivalents thereto.

What is claimed is:

1. An eyewear device, the eyewear device comprising:
an eyeglass frame, the eyeglass frame including a side portion having a front surface, a rear surface defining a hinging interface between the eyeglass frame and a temple, and a slot extending from the front surface to the rear surface therethrough;
the temple including an abutting end portion proximal to the side portion, and an internal elongate slot extending through the abutting end portion of the temple; and
a coupling device for hingedly coupling the temple to the eyeglass frame, the coupling device comprising:
a body coupling the eyeglass frame to the temple, the body formed of an elastically deformable material, the body including a single flexible arm of an elongate shape and a front end portion extending perpendicularly outward to the single flexible arm;
wherein the front end portion of the body of the coupling device is positioned and retained against the front surface of the side portion, the single flexible arm extending therefrom into the slot and the internal elongate slot positioned in opposing alignment therewith, the coupling device being configured to flexibly, hingedly couple the temple to the eyeglass frame for positioning the temple between an open in-use position and a closed position for storage, wherein the single flexible arm further includes an attaching element positioned on an end portion distal to the front end portion.

2. The eyewear device of claim 1, wherein the temple further includes a complementary attaching element configured to detachably secure the single flexible arm to the temple via the attaching element.

3. The eyewear device of claim 2, wherein the complementary attaching element is a peg and the attaching element is a hole sized and positioned to capture and retain the peg therein.

4. The eyewear device of claim 1, wherein the single flexible arm comprises at least one frictional element formed along a lengthwise surface of the single flexible arm, and the internal elongate slot of the temple includes at least one complementary frictional element positioned along an opposing surface to the lengthwise surface, the at least one frictional element and the at least one complementary frictional element being shaped and positioned to frictionally engage and detachably retain the temple to the eyeglass frame via the coupling device.

5. The eyewear device of claim 4, wherein the at least one frictional element are a plurality of teeth and the at least one complementary frictional element are a plurality of complementary teeth configured to mesh with the plurality of teeth to detachably retain the temple to the eyeglass frame.

6. The eyewear device of claim 4, wherein the body including the at least one frictional element of the single flexible arm is formed of an elastomer material and the at least one complementary frictional element are formed of one of a metal, a metal alloy, and a plastic.

7. The eyewear device of claim 1, wherein the body of the coupling device is formed of an elastomer material.

8. The eyewear device of claim 7, wherein the elastomer material is one of a rubber and a thermoplastic elastomer material.

9. The eyewear device of claim 1, wherein the body of the coupling device is sufficiently elastic to allow over-rotation of the temple in any direction beyond a nominal operating angular range of motion relative to the eyeglass frame without breakage of the temple or the coupling device.

10. An eyewear device, the eyewear device comprising:
an eyeglass frame, the eyeglass frame including a side portion having a front surface, a rear surface defining a hinging interface between the eyeglass frame and a temple, and a slot extending from the front surface to the rear surface therethrough;
the temple including an abutting end portion proximal to the side portion, and an internal elongate slot extending through the abutting end portion of the temple;
a coupling device for hingedly coupling the temple to the eyeglass frame, the coupling device comprising:
a body coupling the eyeglass frame to the temple, the body formed of an elastically deformable material, the body including a single flexible arm of an elongate shape and a front end portion extending perpendicularly outward to the single flexible arm;
wherein the front end portion of the body of the coupling device is positioned and retained against the front surface of the side portion, the single flexible arm extending therefrom into the slot and the internal elongate slot positioned in opposing alignment therewith, the coupling device being configured to flexibly, hingedly couple the temple to the eyeglass frame for positioning the temple between an open in-use position and a closed position for storage; and
a pair of cooperating stabilizing elements, a first stabilizing element of the pair being positioned on an end surface of the abutting end portion of the temple and a second stabilizing element of the pair being positioned on the hinging interface of the eyeglass frame to cooperate and engage therewith for stably repositioning the temple between the open in-use position and the closed position for storage.

11. The eyewear device of claim 10, wherein one of the pair of cooperating stabilizing elements includes a protruding cylindrical surface and a complementary one of the pair includes a complementary cylindrically shaped indentation.

12. The eyewear device of claim 10, wherein the pair of cooperating stabilizing elements includes a first pair and a second pair, the first stabilizing element of each of the first pair and the second pair being positioned along opposing sides of the internal elongate slot in the temple, and the second stabilizing element of each of the first pair and the second stabilizing element of the second pair being positioned along opposing sides of the slot in the eyeglass frame.

13. The eyewear device of claim 12, wherein the first stabilizing element of the first pair is positioned proximate an upper edge of the abutting end portion of the temple, and the first stabilizing element of the second pair is positioned proximate a lower edge of the abutting end portion, the internal elongate slot being positioned between the first stabilizing element of the first pair and the second pair, and the second stabilizing element of each of the first pair and the second pair is positioned and shaped to engage each of the first stabilizing elements, the slot being positioned between the second stabilizing element of the first pair and the second pair and in alignment with the internal elongate slot in the open in-use position.

14. The eyewear device of claim 10, wherein the first stabilizing element further includes an inner-facing portion positioned along an inner-facing surface of the abutting end portion of the temple, wherein the first stabilizing element further includes a pair of locking tabs, and the second stabilizing element includes a notch shaped to receive each of the locking tabs, wherein a first tab of the pair of locking tabs protrudes from the end surface of the temple and is seated in the notch in the open in-use position, and a second tab of the pair of locking tabs protrudes from the inner-facing surface of the temple and is seated in the notch in the closed position.

15. The eyewear device of claim 14, wherein the body of the coupling device is sufficiently elastic to allow the temple to remain operatively connected to the eyeglass frame in transitioning from the in-use position to the closed position, the temple being configured to sustain sufficient rotational force to disengage the first tab from the notch and for flexibly hinging the temple to engage the second tab in the notch in the closed position.

16. The eyewear device of claim 14, wherein the first stabilizing element includes a protruding curved portion of a cylindrical slice protruding from the abutting end surface and the inner-facing surface of the temple, wherein an axis of the cylindrical slice is positioned along a vertical axis of the eyeglass frame, and wherein the first tab and the second tab protrude from two angularly separated positions along the protruding curved portion for engaging the notch in the open in-use position and the closed position, respectively, and wherein the hinging interface of the eyeglass frame includes an indented concave portion including the notch further indented therein, the indented concave portion shaped for seating the protruding curved portion therein.

17. The eyewear device of claim 14, wherein each of the first tab and the second tab are rectangularly shaped protrusions positioned along the abutting end surface and the inner-facing surface, respectively, of the temple, and the notch is an indentation in the hinging interface of the eyeglass frame shaped to snugly receive each of the first tab and the second tab.

18. An eyewear device, the eyewear device comprising:
an eyeglass frame, the eyeglass frame including a side portion having a front surface, a rear surface defining a hinging interface between the eyeglass frame and a temple, and a slot extending from the front surface to the rear surface therethrough;
the temple including an abutting end portion proximal to the side portion, and an internal elongate slot extending through the abutting end portion of the temple;
a coupling device for hingedly coupling the temple to the eyeglass frame, the coupling device comprising:
a body coupling the eyeglass frame to the temple, the body formed of an elastically deformable material, the body including a single flexible arm of an elongate shape and a front end portion extending perpendicularly outward to the single flexible arm;

wherein the front end portion of the body of the coupling device is positioned and retained against the front surface of the side portion, the single flexible arm extending therefrom into the slot and the internal elongate slot positioned in opposing alignment therewith, the coupling device being configured to flexibly, hingedly couple the temple to the eyeglass frame for positioning the temple between an open in-use position and a closed position for storage; and wherein the side portion of the eyeglass frame includes a recess in the front surface, wherein the front end portion of the body of the coupling device is positioned against the front surface and retained within the recess.

19. An eyewear device, the eyewear device comprising:

an eyeglass frame, the eyeglass frame including a side portion having a front surface, a rear surface defining a hinging interface between the eyeglass frame and a temple, and a slot extending from the front surface to the rear surface therethrough;

the temple including an abutting end portion proximal to the side portion, and an internal elongate slot extending through the abutting end portion of the temple; and a coupling device for hingedly coupling the temple to the eyeglass frame, the coupling device comprising:

a body coupling the eyeglass frame to the temple, the body formed of an elastically deformable material, the body including a single flexible arm of an elongate shape and a front end portion extending perpendicularly outward to the single flexible arm;

wherein the front end portion of the body of the coupling device is positioned and retained against the front surface of the side portion, the single flexible arm extending therefrom into the slot and the internal elongate slot positioned in opposing alignment therewith, the coupling device being configured to flexibly, hingedly couple the temple to the eyeglass frame for positioning the temple between an open in-use position and a closed position for storage, and wherein the temple further includes a pocket intersecting the internal elongate slot and extending along an inner-facing side of the abutting end portion.

* * * * *